(12) United States Patent
Lyu et al.

(10) Patent No.: US 12,143,922 B2
(45) Date of Patent: Nov. 12, 2024

(54) METHOD AND APPARATUS FOR NODE USED FOR WIRELESS COMMUNICATION

(71) Applicant: QUECTEL WIRELESS SOLUTIONS CO., LTD., Shanghai (CN)

(72) Inventors: Ling Lyu, Shanghai (CN); Zheng Zhao, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 18/402,452

(22) Filed: Jan. 2, 2024

(65) Prior Publication Data
US 2024/0284304 A1 Aug. 22, 2024

Related U.S. Application Data

(63) Continuation of application No. PCT/CN2023/076510, filed on Feb. 16, 2023.

(51) Int. Cl.
*H04W 48/10* (2009.01)
*H04B 17/309* (2015.01)
(Continued)

(52) U.S. Cl.
CPC ............. *H04W 48/10* (2013.01); *H04L 1/08* (2013.01); *H04W 74/0833* (2013.01)

(58) Field of Classification Search
CPC ... H04W 92/18; H04W 56/00; H04W 56/001; H04W 72/04; H04W 56/0005;
(Continued)

(56) References Cited

U.S. PATENT DOCUMENTS

2019/0223228 A1* 7/2019 Ko ..................... H04W 74/0891
2020/0267803 A1* 8/2020 Kwak ................. H04L 27/2605
(Continued)

FOREIGN PATENT DOCUMENTS

CN 112788762 5/2021
WO WO 2022071755 4/2022

OTHER PUBLICATIONS

International Search Report and Written Opinion in International Appln. No. PCT/CN2023/076510, mailed on Nov. 9, 2023, 13 pages (with English translation).
(Continued)

*Primary Examiner* — Khaled M Kassim
*Assistant Examiner* — Jason A Harley
(74) *Attorney, Agent, or Firm* — Fish & Richardson P.C.

(57) ABSTRACT

A method and an apparatus for a node used for wireless communication are provided. The method includes: receiving a first SS/PBCH block, wherein an index of the first SS/PBCH block is one of a plurality of candidate SS/PBCH block indexes; and transmitting a first preamble group, wherein the first preamble group comprises a plurality of preambles; a first PRACH occasion group comprises a plurality of PRACH occasions, and the plurality of PRACH occasions in the first PRACH occasion group are configured for transmitting the plurality of preambles in the first preamble group; and any two PRACH occasions in the first PRACH occasion group are orthogonal in time domain.

20 Claims, 4 Drawing Sheets

(51) Int. Cl.
  *H04L 1/08* (2006.01)
  *H04L 5/00* (2006.01)
  *H04W 56/00* (2009.01)
  *H04W 72/04* (2023.01)
  *H04W 72/51* (2023.01)
  *H04W 74/00* (2009.01)
  *H04W 74/0833* (2024.01)

(58) Field of Classification Search
  CPC ......... H04W 72/0466; H04W 72/0446; H04W 72/1268; H04W 74/008; H04L 27/2655; H04L 5/00
  USPC .......................................................... 370/336
  See application file for complete search history.

(56) References Cited

U.S. PATENT DOCUMENTS

| | | | |
|---|---|---|---|
| 2020/0351955 A1* | 11/2020 | Jeon | H04W 80/02 |
| 2021/0058111 A1* | 2/2021 | Liu | H04L 1/189 |
| 2021/0168743 A1* | 6/2021 | Sheng | H04L 1/1614 |
| 2022/0046724 A1 | 2/2022 | Maso et al. | |
| 2022/0061099 A1* | 2/2022 | Sun | H04W 74/0833 |
| 2022/0070943 A1* | 3/2022 | Xu | H04W 74/0841 |
| 2023/0060894 A1* | 3/2023 | Rastegardoost | H04W 56/001 |
| 2023/0089277 A1* | 3/2023 | Liu | H04W 74/002 370/329 |

OTHER PUBLICATIONS

MCC Support, "Final Report of 3GPP TSG RAN WG1 #110bis-e v1.0.0," 3GPP TSG RAN WG1 Meeting #111, R1-2210801, Toulouse, France, Nov. 14-18, 2022, 206 pages.

NTT Docomo, Inc., "Maintenance for NR random access," 3GPP TSG RAN WG1 Meeting #94, R1-1809135, Gothenburg, Sweden, Aug. 20-24, 2018, 16 pages.

* cited by examiner

METHOD AND APPARATUS FOR NODE USED FOR WIRELESS COMMUNICATION

CROSS-REFERENCE TO RELATED APPLICATIONS

This application is a continuation of International Application No. PCT/CN2023/076510, filed on Feb. 16, 2023, the disclosure of which is hereby incorporated by reference in its entirety.

TECHNICAL FIELD

The present application relates to the field of communications technologies, and more specifically, to a method and an apparatus for a node used for wireless communication.

BACKGROUND

In order to enhance coverage performance of random access, a scheme based on physical random access channel (PRACH) transmission with a preamble group is planned to be introduced in some communications systems, such as a new radio (NR) system. However, in a PRACH transmission with the preamble group, a conventional method of mapping between a synchronization signal block (also referred to as synchronization signal/physical broadcast channel block, or SSB or SS/PBCH block for short) and a random access channel occasion (RACH occasion, or RO for short, also referred to as PRACH occasion, or PRO for short) used for wireless communication may cause that a plurality of random access channel occasions overlap in time domain. This imposes higher requirements on system configuration, and also increases system processing complexity and increases transmission power overheads. This may cause a relatively large time interval between a plurality of random access channel occasions, thereby enlarging an access delay of a system, or may result in a low utilization efficiency of random access resources, or may result in an increased additional signaling overhead.

SUMMARY

In view of this, embodiments of the present application aim to provide a method and an apparatus for a node used for wireless communication. Various aspects of the present application are described below.

According to a first aspect, a method for a first node used for wireless communication is provided, including: receiving a first synchronization signal block, where an index of the first synchronization signal block is one of a plurality of candidate synchronization signal block indexes (also referred to as SS/PBCH block indexes); and transmitting a first preamble group, where the first preamble group includes a plurality of preambles. A first random access channel occasion group (also referred to as PRACH occasion group) includes a plurality of random access channel occasions (also referred to as PRACH occasions), and the plurality of random access channel occasions in the first random access channel occasion group are used for transmitting the plurality of preambles in the first preamble group. Any two random access channel occasions in the first random access channel occasion group are orthogonal in time domain. The plurality of candidate synchronization signal block indexes are mapped to a plurality of random access channel occasion groups in a first mapping order, and the first random access channel occasion group is one of the plurality of random access channel occasion groups. The first random access channel occasion group corresponds to a first occasion group type, and the first occasion group type is one of a plurality of candidate occasion group types. The index of the first synchronization signal block, the first occasion group type, and the first mapping order are used to determine the first random access channel occasion group.

According to a second aspect, a method for a second node used for wireless communication is provided, including: transmitting one or more synchronization signal blocks, where a first synchronization signal block is one of the one or more synchronization signal blocks, and an index of the first synchronization signal block is one of a plurality of candidate synchronization signal block indexes; and receiving a first preamble group, where the first preamble group includes a plurality of preambles. A first random access channel occasion group includes a plurality of random access channel occasions, and the plurality of random access channel occasions in the first random access channel occasion group are used for transmitting the plurality of preambles in the first preamble group. Any two random access channel occasions in the first random access channel occasion group are orthogonal in time domain. The plurality of candidate synchronization signal block indexes are mapped to a plurality of random access channel occasion groups in a first mapping order, and the first random access channel occasion group is one of the plurality of random access channel occasion groups. The first random access channel occasion group corresponds to a first occasion group type, and the first occasion group type is one of a plurality of candidate occasion group types. The index of the first synchronization signal block, the first occasion group type, and the first mapping order are used to determine the first random access channel occasion group.

According to a third aspect, a first node used for wireless communication is provided, including: a first receiving set, configured to receive a first synchronization signal block, where an index of the first synchronization signal block is one of a plurality of candidate synchronization signal block indexes; and a first transmitting set, configured to transmit a first preamble group, where the first preamble group includes a plurality of preambles. A first random access channel occasion group includes a plurality of random access channel occasions, and the plurality of random access channel occasions in the first random access channel occasion group are used for transmitting the plurality of preambles in the first preamble group. Any two random access channel occasions in the first random access channel occasion group are orthogonal in time domain. The plurality of candidate synchronization signal block indexes are mapped to a plurality of random access channel occasion groups in a first mapping order, and the first random access channel occasion group is one of the plurality of random access channel occasion groups. The first random access channel occasion group corresponds to a first occasion group type, and the first occasion group type is one of a plurality of candidate occasion group types. The index of the first synchronization signal block, the first occasion group type, and the first mapping order are used to determine the first random access channel occasion group.

According to a fourth aspect, a second node used for wireless communication is provided, including: a first transmitting set, configured to transmit one or more synchronization signal blocks, where a first synchronization signal block is one of the one or more synchronization signal blocks, and an index of the first synchronization signal block is one of a plurality of candidate synchronization signal block indexes; and a first receiving set, configured to receive a first preamble group, where the first preamble group includes a plurality of preambles. A first random access channel occasion group includes a plurality of random access channel occasions, and the plurality of random access channel occasions in the first random access channel occasion group are used for transmitting the plurality of preambles in the first preamble group. Any two random access channel occasions in the first random access channel occasion group are orthogonal in time domain. The plurality of candidate synchronization signal block indexes are mapped to a plurality of random access channel occasion groups in a first mapping order, and the first random access channel occasion group is one of the plurality of random access channel occasion groups. The first random access channel occasion group corresponds to a first occasion group type, and the first occasion group type is one of a plurality of candidate occasion group types. The index of the first synchronization signal block, the first occasion group type, and the first mapping order are used to determine the first random access channel occasion group.

According to a fifth aspect, a first node used for wireless communication is provided, including a processor, a memory, and a communications interface. The memory is configured to store one or more computer programs, and the processor is configured to call the computer programs in the memory to cause the first node to perform some or all of the steps in a method according to the first aspect.

According to a sixth aspect, a second node used for wireless communication is provided, including a processor, a memory, and a communications interface. The memory is configured to store one or more computer programs, and the processor is configured to call the computer programs in the memory to cause the second node to perform some or all of the steps in a method according to the second aspect.

According to a seventh aspect, an embodiment of the present application provides a communications system, and the system includes the first node and/or the second node described above. In another possible design, the system may further include another device interacting with the first node or the second node in the solution provided in the embodiments of the present application.

According to an eighth aspect, an embodiment of the present application provides a computer-readable storage medium. The computer-readable storage medium stores a computer program, and the computer program causes a first node or a second node to perform some or all of the steps in the methods according to the foregoing aspects.

According to a ninth aspect, an embodiment of the present application provides a computer program product. The computer program product includes a non-transitory computer-readable storage medium storing a computer program, and the computer program is operable to cause a first node or a second node to perform some or all of the steps in the methods according to the foregoing aspects. In some implementations, the computer program product may be a software installation package.

According to a tenth aspect, an embodiment of the present application provides a chip. The chip includes a memory and a processor, and the processor may call and run a computer program from the memory to implement some or all of the steps in the methods according to the foregoing aspects.

In the embodiments of the present application, a first node can determine, based on an index of a first synchronization signal block, a first occasion group type, and a first mapping order, a first random access channel occasion group corresponding to the first synchronization signal block, so that any two random access channel occasions in the determined first random access channel occasion group are orthogonal in time domain, that is, any two random access channel occasions in the first random access channel occasion group do not overlap in time domain.

In the embodiments of the present application, any two random access channel occasions in the first random access channel occasion group determined by the first node based on the index of the first synchronization signal block, the first occasion group type, and the first mapping order do not overlap in time domain. In the embodiments of the present application, a method for mapping a synchronization signal block and a random access channel occasion is changed to ensure that any two random access channel occasions in the first random access channel occasion group do not overlap in time domain, so that a requirement for system configuration may be reduced, system processing complexity may be reduced, and transmission power overheads may be reduced.

The method for mapping a synchronization signal block and a random access channel occasion provided in the embodiments of the present application helps ensure a small time interval between a plurality of random access channel occasions in the first random access channel occasion group, so that an access delay of a system is reduced.

In addition, the method for mapping a synchronization signal block and a random access channel occasion provided in the embodiments of the present application helps improve utilization efficiency of random access resources, or helps reduce signaling overheads.

DETAILED DESCRIPTION OF THE EMBODIMENTS

The following clearly and completely describes the technical solutions in the embodiments of the present application with reference to the accompanying drawings in the embodiments of the present application. Apparently, the described embodiments are merely some but not all of the embodiments of the present application.

Communications System Architecture

Figure 1:
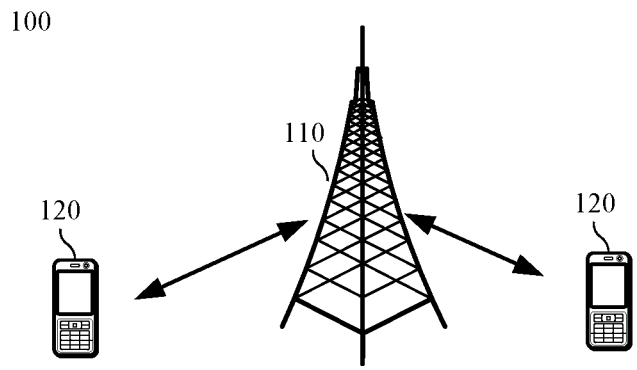
FIG. 1 is an example diagram of a system architecture of a wireless communications system to which embodiments of the present application are applicable.

FIG. 1 is an example diagram of a system architecture of a wireless communications system 100 to which embodiments of the present application are applicable. The wireless communications system 100 may include a network device 110 and a user equipment (UE) 120. The network device 110 may be a device in communication with the UE 120. The network device 110 may provide communication coverage for a specific geographic area, and may communicate with a UE 120 located within the coverage.

FIG. 1 shows an example in which there is one network device and two UEs. Optionally, the wireless communications system 100 may include a plurality of network devices, and another quantity of UEs may be included in coverage of each network device, which is not limited in the embodiments of the present application.

Optionally, the wireless communications system 100 may further include other network entities such as a network controller and a mobility management entity, which is not limited in the embodiment of the present application.

It should be understood that, although the technical solutions of the embodiments of the present application are directed to random access, the technical solutions of the embodiments of the present application can also be applied to beam failure recovery. Further, although the technical solutions of the embodiments of the present application are described for a Type-1 random access procedure, the technical solutions of the embodiments of the present application can also be applied to a Type-2 random access procedure. Further, although the technical solutions of the embodiments of the present application are described for a Uu interface, the technical solutions of the embodiments of the present application can also be applied to a PC5 interface. Further, although the technical solutions of the embodiments of the present application are described for single-carrier communication, the technical solutions of the embodiments of the present application can also be applied to multi-carrier communication. Further, although the technical solutions of the embodiments of the present application are described for multi-antenna communication, the technical solutions of the embodiments of the present application can also be applied to single-antenna communication. Further, although the technical solutions of the embodiments of the present application are described for a scenario of a UE and a base station, the technical solutions of the embodiments of the present application are also applicable to a vehicle-to-everything (V2X) scenario, and a scenario in which a UE communicates with a relay and the relay communicates with a base station, and achieve a technical effect similar to that in the scenario of a UE and a base station. Further, the technical solutions of the embodiments of the present application may be applied to various communication scenarios, such as an enhanced mobile broadband (eMBB) scenario, an ultra-reliable and low latency communications (URLLC) scenario, and a massive machine type communication (mMTC) scenario. In addition, using a unified solution for different scenarios may also help reduce hardware complexity and cost.

It should be understood that, in the case of no conflict, the embodiments and features in the embodiments for a first node of the present application may be applied to a second node, and vice versa. In the case of no conflict, the embodiments and features in the embodiments of the present application may be arbitrarily combined with each other.

It should be understood that, the technical solutions in the embodiments of the present application may be applied to various communications systems, for example, a 5th generation (5G) system or new radio (NR) system, a long term evolution (LTE) system, an LTE frequency division duplex (FDD) system, and an LTE time division duplex (TDD). The technical solutions provided in the present application may also be applied to future communications systems, such as a 6th generation mobile communications system and a satellite communications system.

The UE in the embodiments of the present application may also be referred to as a terminal device, an access terminal, a subscriber unit, a subscriber station, a mobile, a mobile station (MS), a mobile terminal (MT), a remote station, a remote terminal, a mobile device, a user terminal, a terminal, a wireless communications device, a user agent, or a user apparatus. The UE in the embodiments of the present application may be a device providing a user with voice and/or data connectivity and capable of connecting people, objects, and machines, such as a handheld device or vehicle-mounted device having a wireless connection function. The UE in the embodiments of the present application may be a mobile phone, a tablet computer (pad), a notebook computer, a palmtop computer, a mobile internet device (MID), a wearable device, a virtual reality (VR) vehicle, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in smart city, a wireless terminal in smart home, or the like. Optionally, the UE may be used to act as a base station. For example, the UE may act as a scheduling entity, which provides a sidelink signal between UEs in V2X or device to device (D2D), or the like. For example, a cellular phone and a vehicle may communicate with each other by using a sidelink signal. A cellular phone and a smart home device may communicate with each other, without a relay of a communication signal through a base station.

The network device in the embodiments of the present application may be a device for communicating with the UE. The network device may also be referred to as an access network device or a wireless access network device. For example, the network device may be a base station. The network device in the embodiments of the present application may be a radio access network (RAN) node (or device) that accesses the UE to a wireless network. The base station may broadly cover various names in the following, or may be interchangeable with the following names, for example, a NodeB, an evolved NodeB (eNB), a next generation NodeB (gNB), a relay station, an access point, a transmitting and receiving point (TRP), a transmitting point (TP), a master eNB (MeNB), a secondary eNB (SeNB), a multi-standard radio (MSR) node, a home base station, a network controller, an access node, a radio node, an access point (AP), a transmission node, a transceiver node, a base band unit (BBU), a remote radio unit (RRU), an active antenna unit (AAU), a remote radio head (RRH), a central unit (CU), a distributed unit (DU), and a positioning node. The base station may be a macro base station, a micro base station, a relay node, a donor node, or the like, or a combination thereof. Alternatively, the base station may be a communications module, a modem, or a chip disposed in the device or apparatus described above. Alternatively, the base station may be a mobile switching center, a device that functions as a base station in D2D, V2X, and machine-to-machine (M2M) communications, a network-side device in a 6G network, a device that functions as a base station in a future communications system, or the like. The base station may support networks of the same or different access technologies. A specific technology and specific device form used by the network device are not limited in the embodiments of the present application.

The base station may be fixed or mobile. For example, a helicopter or drone may be configured to act as a mobile base station, and one or more cells may move according to the position of the mobile base station. In other examples, a helicopter or drone may be configured to serve as a device in communication with another base station.

In some deployments, the network device in the embodiments of the present application may be a CU or a DU, or the network device may include a CU and a DU. The gNB may further include an AAU.

The network device and the UE may be deployed on land, including indoor or outdoor, handheld or vehicle-mounted; or may be deployed on water; or may be deployed on an airplane, a balloon, and a satellite in the air. In the embodiments of the present application, the scenarios where the network device and the UE are located are not limited.

It should be understood that, all or some of functions of the communications device in the present application may also be implemented by software functions running on hardware, or by virtualization functions instantiated on a platform (such as a cloud platform).

It should be understood that, for the explanation of the terminology in the embodiments of the present application, reference may be made to description protocols TS36 series, TS37 series, and TS38 series of 3GPP, and reference may also be made to description protocols of the Institute of Electrical and Electronics Engineers (IEEE).

Coverage Enhancements of Preamble Transmission

Coverage performance of a communications system (for example, an NR system) is an important factor that needs to be considered when an operator performs commercial deployment of a communication network, because the coverage performance of a communications system directly affects service quality of the communications system and costs of the operator, for example, capital expenditure (CAPEX) of the operator and operating expense (OPEX) of the operator.

The coverage performance of a communications system varies with different operating frequency bands of the communications system. For example, compared with an LTE system, an operating frequency band of an NR system is higher (for example, a millimeter wave frequency band), which results in a larger path loss of the NR system, thereby resulting in a poorer coverage performance of the NR system. Therefore, as a frequency band supported by a communications system may become increasingly high, how to enhance coverage of the communications system becomes a problem to be solved.

In most scenarios of practical deployment, since capability of a UE is lower than that of a network device, coverage performance of an uplink is a bottleneck of coverage enhancement of a communications system. With the development of communications technologies, uplink services in some emerging vertical use cases gradually increase, for example, in a video uploading service, in a scenario with many uplink services, how to enhance uplink coverage is a problem that needs to be further solved.

In the related art, there has been a technical solution of coverage enhancement for some uplinks. For example, in Release 17 (Rel-17) of the NR, a coverage enhancement solution has been designed for a physical uplink shared channel (PUSCH), a physical uplink control channel (PUCCH), and a message 3 (Msg 3) in a random access procedure.

However, there is no coverage enhancement solution designed for a PRACH in the Rel-17, but preamble transmission performance is very important to many procedures such as an initial access procedure and a beam failure recovery procedure, and therefore, it is also very important to perform coverage enhancement on a PRACH. On such a basis, Rel-18 formally establishes a work item (WI) of "further NR coverage enhancements", in which enhancing coverage performance of preamble transmission is one of the important topics of the work item.

As a possible implementation, preamble group transmission may be used for a coverage enhancement of preamble transmission. In other words, a coverage enhancement of preamble transmission may be implemented through repeated preamble transmissions (for example, a preamble is sent in a PRACH a plurality of times).

In the embodiments of the present application, preamble group transmission may refer to preamble group transmission performed by using a same beam, or may refer to preamble group transmission performed by using different beams. The preamble group transmission performed by using a same beam is used as an example, an agreement has been reached at 3rd generation partnership project (3GPP) radio access network (RAN) 1 #110-bis-e meeting that PRACH occasions (or referred to as RACH occasions) at different time instances at least may be used for preamble group transmission performed by using a same beam. In addition, at the RAN1 #110-bis-e meeting, a repetition factor of preamble group transmission (a quantity/times of preamble group transmission) performed by using a same beam is further defined, and the repetition factor may at least be one of 2, 4, and 8.

Association Mapping of Synchronization Signal Blocks and PRACH Occasions

A synchronization signal block is a signal structure defined in a communication standard, and may include a primary synchronization signal (PSS), a secondary synchronization signal (SSS), and a physical broadcast channel (PBCH). In some embodiments, the synchronization signal block may be represented as a synchronization signal block (SSB), and in some embodiments, the synchronization signal block may also be represented as a synchronization signal/physical broadcast channel block (SS/PBCH block), that is, the synchronization signal block may also be referred to as a synchronization signal broadcast channel block, which is not limited in the embodiments of the present application. It should be noted that, the following description uses an example in which the synchronization signal block is represented as an SSB, and certainly, the SSB in the following description may be replaced with an SS/PBCH block.

An SSB is a group of resources transmitted on a basic orthogonal frequency division multiplexing grid, and the group of resources may include, for example, one or more of the following resources: a time domain resource, a frequency resource, and a code domain resource.

In a process that a UE performs initial access or beam failure recovery, when detecting an SSB sent by a network device, the UE may obtain an SSB index of the SSB, so that a time domain position where the SSB is located may be learned, so as to implement downlink synchronization with the network device. In order to implement uplink synchronization, the UE needs to transmit a preamble to the network device. How the UE selects a preamble to be sent and on which PRACH occasion the selected preamble should be sent are both determined by the UE based on the received (or detected) SSB.

As a feasible technical solution, an SSB may be associated and mapped with at least one preamble in at least one PRACH occasion, so that when the UE performs initial access or beam failure recovery, an associated PRACH occasion and preamble may be determined based on a received SSB, such that a preamble transmission may continue to be performed.

In the related art, an association and mapping relationship between an SSB and a PRACH occasion/preamble follows the following order: first, in an increasing order of preamble indexes in a single PRACH occasion; second, in an increasing order of frequency resource indexes for frequency multiplexed PRACH occasions; and third, in an increasing order of time domain resource indexes for time multiplexed PRACH occasions within a PRACH slot; and fourth, in an increasing order of indexes for PRACH slots.

Figure 2:
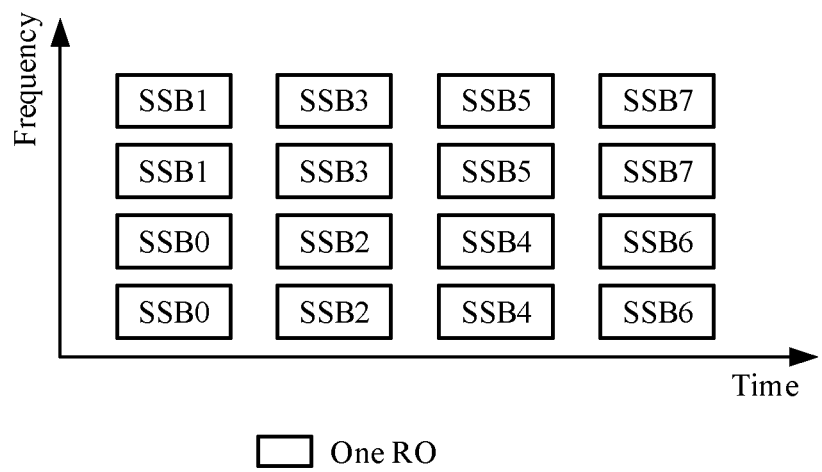
FIG. 2 is an example diagram of a mapping relationship between a synchronization signal block and a random access channel occasion.

An example of the association and mapping relationship between an SSB and a PRACH occasion is provided below with reference to FIG. 2. In the example of FIG. 2, it is assumed that there are eight SSB beams, and SSB indexes corresponding to the eight SSB beams are SSB0-SSB7; parameter SSB-perRACH-Occasion sent by a network device to a UE is 1/2; and a quantity of frequency multiplexed PRACH occasions sent by the network device to the UE is 4. In this case, PRACH occasions corresponding to SSBs are as shown in FIG. 2, where each block in the figure represents one PRACH occasion.

As mentioned above, a PRACH coverage enhancement may be performed by means of preamble group transmission. In a scenario of preamble group transmission, if a plurality of PRACH occasions associated with SSBs are determined by using the foregoing association and mapping relationship, a plurality of PRACH occasions associated with a same SSB may be overlapped in time domain, thereby increasing transmission power overheads of a device.

In addition, in a scenario of preamble group transmission performed by using a same beam, if a plurality of PRACH occasions associated with SSBs are determined by using the foregoing association and mapping relationship, a collision also occurs with a time domain orthogonal PRACH occasion scheme for preamble group transmission that is achieved on a RAN1 #110-bis-e meeting.

In conclusion, in a scenario of preamble group transmission, how to determine a plurality of PRACH occasions associated with an SSB based on the SSB is a problem required to be solved.

In order to solve the foregoing problem, the embodiments of the present application provide a method and an apparatus for a node used for wireless communication, which can effectively associate and map an SSB to a plurality of PRACH occasions orthogonal to each other in time domain, thereby helping reduce transmission power overheads.

The embodiments of the present application may be applied to a scenario of preamble group transmission, that is, repeated transmissions of a plurality of PRACHs may be used to implement PRACH coverage enhancement.

In some embodiments, the preamble group transmission mentioned in the embodiments of the present application may refers to preamble group transmission performed by using a same beam; in this case, repeated transmissions of a plurality of preambles are performed on a same beam to obtain a signal to noise ratio (SNR) gain. In some embodiments, the preamble group transmission mentioned in the embodiments of the present application may refers to preamble group transmission performed by using different beams; in this case, repeated transmissions of a plurality of preambles are performed on different beams to obtain a diversity gain.

It should be noted that, the beam mentioned in the embodiments of the present application may be replaced by another term, such as an antenna port, a spatial filter, and a spatial parameter, and meanings expressed by the terms may be consistent. No distinction is made between the terms in the embodiments of the present application.

The embodiments of the present application may be applied to an initial access procedure or a beam failure recovery procedure. The initial access procedure is used as an example, the embodiments of the present application may be applied to a four-step random access procedure (namely, type-1 random access procedure), or may be applied to a two-step random access procedure (namely, type-2 random access procedure), which is not limited in the embodiments of the present application.

Figure 3:
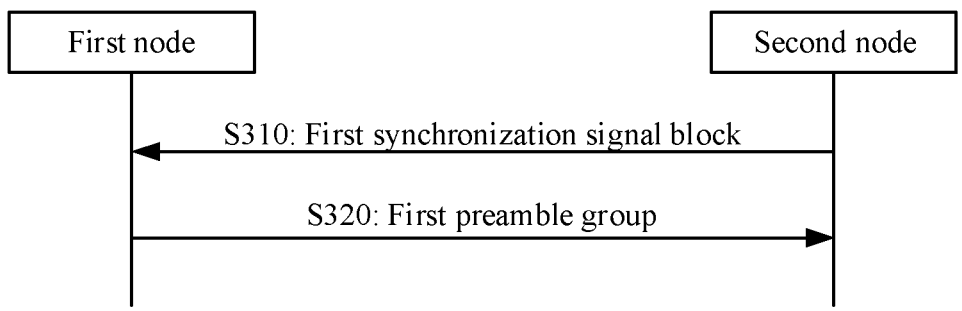
FIG. 3 is a schematic flowchart of a method used for wireless communication according to an embodiment of the present application.

The method embodiments of the present application will be described below in detail with reference to the drawings. FIG. 3 is a schematic flowchart of a method for a node used for wireless communication according to an embodiment of the present application. The method shown in FIG. 3 is introduced from a perspective of interaction between a first node and a second node.

In an embodiment, the first node may be a network-controlled repeater (NCR).

In an embodiment, the first node may be a UE, for example, a UE 120 shown in FIG. 1.

In an embodiment, the first node may be a relay, such as a relay terminal.

In an embodiment, the second node may be a network device, for example, a network device 110 shown in FIG. 2.

The method shown in FIG. 3 may include Step S310 and Step S320, and these steps will be introduced below.

In Step S310, the first node receives a first synchronization signal block.

An index of the first synchronization signal block is one of a plurality of candidate synchronization signal block indexes.

In an embodiment, the first synchronization signal block may be one of one or more synchronization signal blocks sent by the second node.

In an embodiment, a synchronization signal block (for example, a first synchronization signal block, and one or more synchronization signal blocks sent by the second node) may be represented as an SSB; or the synchronization signal block may be represented as an SS/PBCH block, which is not limited in the embodiments of the present application.

In an embodiment, the index of the first synchronization signal block is mapped to a first random access channel occasion group. The first random access channel occasion group includes a plurality of random access channel occasions.

In an embodiment, the plurality of random access channel occasions included in the first random access channel occasion group may be represented as RACH occasions (ROs) or PRACH occasions (PROs), which is not limited in the embodiments of the present application.

In Step S320, the first node transmits a first preamble group. The first preamble group includes a plurality of preambles. In some embodiments, a preamble may also be referred to as a preamble code, which is not limited in the embodiments of the present application.

The plurality of random access channel occasions in the first random access channel occasion group are used for transmitting the plurality of preambles in the first preamble group. In other words, the plurality of preambles in the first preamble group may be transmitted on the plurality of random access channel occasions in the first random access channel occasion group, for example, each preamble is transmitted on a random access channel occasion.

Any two random access channel occasions in the first random access channel occasion group are orthogonal in time domain. Thus, any two random access channel occasions in the first random access channel occasion group do not overlap in time domain, that is, a plurality of random access channel occasions to which the first synchronization signal block is associated and mapped do not overlap in time domain.

In an embodiment, any random access channel occasion in the first random access channel occasion group is valid. For example, for a paired spectrum or a supplementary uplink band, all random access channel occasions may be valid. Alternatively, for an unpaired spectrum, a random access channel occasion may be valid if a specific condition is satisfied, and the condition may be, for example, associated with the parameter tdd-UL-DL-ConfigurationCommon or the like.

In an embodiment, the plurality of candidate synchronization signal block indexes described above may be mapped to a plurality of random access channel occasion groups in a first mapping order, where the first random access channel occasion group is one of the plurality of random access channel occasion groups. How the plurality of candidate synchronization signal block indexes are mapped to a plurality of random access channel occasion groups in a first mapping order will be described in detail below, and details are not described herein.

In an embodiment, any random access channel occasion group in the plurality of random access channel occasion groups includes at least one random access channel occasion. The plurality of random access channel occasion groups including the first random access channel occasion group is used as an example, the first random access channel occasion group may include at least one random access channel occasion.

In an embodiment, any random access channel occasion group in the plurality of random access channel occasion groups includes a plurality of (two or more) random access channel occasions. For example, the first random access channel occasion group may include a plurality of random access channel occasions.

In an embodiment, any two random access channel occasions included in any random access channel occasion group in the plurality of random access channel occasion groups are orthogonal in time domain.

In an embodiment, any two random access channel occasions being orthogonal in time domain may be understood as that any two random access channel occasions are distributed at different time instances. In some embodiments, the time instance may alternatively be replaced with another term such as time interval, which is not limited in the embodiments of the present application.

In an embodiment, any random access channel occasion group in the plurality of random access channel occasion groups is valid. For example, for a paired spectrum or a supplementary uplink band, all random access channel occasion groups may be valid. Alternatively, for an unpaired spectrum, the random access channel occasion group may be valid if a specific condition is satisfied, and the condition may be, for example, associated with the parameter tdd-UL-DL-ConfigurationCommon or the like.

In an embodiment, one or more random access channel occasions included in any random access channel occasion group in the plurality of random access channel occasion groups are valid.

In an embodiment, at least two random access channel occasions in at least one random access channel occasion group in the plurality of random access channel occasion groups are in two different slots. For example, a first period includes three random access channel slots (PRACH slots), and one or more random access channel occasion groups of the plurality of random access channel occasion groups may occupy two or three PRACH slots in the three PRACH slots.

In an embodiment, all random access channel occasions included in any random access channel occasion group in the plurality of random access channel occasion groups are in a same slot, that is, all random access channel occasions included in any random access channel occasion group in the plurality of random access channel occasion groups are in a same PRACH slot.

In an embodiment, any random access channel occasion group in the plurality of random access channel occasion groups may include a plurality of preambles. Thus, after determining a random access channel occasion group (which may be any random access channel occasion group in the plurality of random access channel occasion groups) corresponding to the first synchronization signal block according to an index of the received (detected) first synchronization signal block, the first node may transmit preambles on the random access channel occasion group.

In an embodiment, for any random access channel occasion group in the plurality of random access channel occasion groups, preamble indexes included in any random access channel occasion in the random access channel occasion group may be the same. The first random access channel occasion group in the plurality of random access channel occasion groups is used as an example, preamble indexes included in a plurality of random access channel occasions that are included in the first random access channel occasion group may all be the same. For example, the preamble indexes included in a plurality of random access channel occasions that are included in the first random access channel occasion group may all range from 0 to 63.

In an embodiment, for any random access channel occasion group in the plurality of random access channel occasion groups, preamble indexes included in any random access channel occasion in the random access channel occasion group may be different or partly different. The first random access channel occasion group in the plurality of random access channel occasion groups is still used as an example, preamble indexes included in a plurality of random access channel occasions that are included in the first random access channel occasion group may be different. For example, the first random access channel occasion group includes four random access channel occasions, and preamble indexes included in the four random access channel occasions may be in a range of 0-63, 64-127, 128-191, and 192-255, respectively.

In an embodiment, the first random access channel occasion group corresponds to a first occasion group type, that is, the first random access channel occasion group is corresponding to the first occasion group type. The first occasion group type is one of a plurality of candidate occasion group types. The first occasion group type and/or a candidate occasion group type may include a plurality of types of information, such as a repetition factor, a frequency hopping indication, and a frequency hopping pattern, which will be described below in detail with reference to specific examples, and details are not described herein.

In the embodiments of the present application, the index of the first synchronization signal block, the first occasion group type, and the first mapping order may be used to determine the first random access channel occasion group. Thus, after receiving the first synchronization signal block, the first node may determine, based on the index of the first synchronization signal block, the first occasion group type, and the first mapping order, the first random access channel occasion group corresponding to the first synchronization signal block. In addition, a plurality of random access channel occasions included in the first random access channel occasion group that is determined by the first node based on the index of the first synchronization signal block, the first occasion group type, and the first mapping order are orthogonal to one another in time domain. Further, the first node transmits a plurality of preambles in the first preamble group on a plurality of random access channel occasions of the first random access channel occasion group, so that a random access delay can be reduced, and utilization efficiency of random access resources can be improved.

In an embodiment, the index of the first synchronization signal block, the first occasion group type, and the first mapping order are used to determine the first random access channel occasion group from a plurality of random access channel occasion groups.

In an embodiment, the index of the first synchronization signal block, the first occasion group type, and the first mapping order are used to determine the first random access channel occasion group from a plurality of random access channel occasion groups in the first period.

In an embodiment, the index of the first synchronization signal block, the first occasion group type, and the first mapping order are used to determine any random access channel occasion in the first random access channel occasion group from a plurality of random access channel occasions in the first period.

An implementation of determining the first random access channel occasion group by using the index of the first synchronization signal block, the first occasion group type, and the first mapping order is not limited in the embodiments of the present application, as long as the first random access channel occasion group corresponding to the first synchronization signal block can be determined by combining the foregoing three kinds of information, or as long as the first random access channel occasion group can be selected from the plurality of random access channel occasion groups by using the foregoing three kinds of information in the embodiments of the present application. The following provides examples of several implementations for determining the first random access channel occasion group by using the index of the first synchronization signal block, the first occasion group type, and the first mapping order.

In an embodiment, the index of the first synchronization signal block, the first occasion group type, and the first mapping order being used to determine the first random access channel occasion group includes that: the index of the first synchronization signal block is mapped to at least two random access channel occasion groups in the plurality of random access channel occasion groups according to the first mapping order, the at least two random access channel occasion groups respectively correspond to at least two different candidate occasion group types, and the first occasion group type is used to determine the first random access channel occasion group from the at least two random access channel occasion groups.

In an embodiment, the index of the first synchronization signal block, the first occasion group type, and the first mapping order being used to determine the first random access channel occasion group includes that: the first occasion group type is used to determine at least L random access channel occasion groups from the plurality of random access channel occasion groups, and the index of the first synchronization signal block and the first mapping order are used to determine the first random access channel occasion group from the at least L random access channel occasion groups, where L is a positive integer greater than 1.

In an embodiment, L is one of $\{4, 8, 64\}$.

In an embodiment, any random access channel occasion group in the plurality of random access channel occasion groups is in the first period.

In an embodiment, the first period may be understood as a mapping cycle of a synchronization signal block and a random access channel occasion.

In an embodiment, the first period may include one or more PRACH slots. The first period including a plurality of PRACH slots is used as an example, a quantity of a plurality of PRACH slots included in the first period is not limited in the embodiments of the present application. For example, the first period may include three PRACH slots, four PRACH slots, or a larger quantity of PRACH slots.

In an embodiment, any random access channel occasion of any random access channel occasion group in the plurality of random access channel occasion groups is in one of a plurality of PRACH slots in the first period.

In an embodiment, the plurality of random access channel occasion groups mentioned above are in the first period. In other words, the plurality of candidate synchronization signal block indexes being mapped to the plurality of random access channel occasion groups in the first mapping order is performed in the first period.

In an embodiment, the first period includes a plurality of random access channel occasions.

In an embodiment, any random access channel occasion in the plurality of random access channel occasion groups is one of the plurality of random access channel occasions included in the first period. Alternatively, one or more of the plurality of random access channel occasions included in the first period may constitute any random access channel occasion group in the plurality of random access channel occasion groups.

In an embodiment, the plurality of candidate synchronization signal block indexes being mapped to a plurality of random access channel occasion groups in a first mapping order may refer to that the plurality of candidate synchronization signal block indexes are mapped to the plurality of random access channel occasion groups in the first period in the first mapping order.

In an embodiment, the plurality of candidate synchronization signal block indexes being mapped to a plurality of random access channel occasion groups in a first mapping order may refer to that the plurality of candidate synchronization signal block indexes are mapped to the plurality of random access channel occasions in the first period in the first mapping order.

In an embodiment, any candidate synchronization signal block index in the plurality of candidate synchronization signal block indexes may be mapped to at least one random access channel occasion group in the first period.

In an embodiment, any candidate synchronization signal block index in the plurality of candidate synchronization signal block indexes may be mapped to at least one random access channel occasion in the first period.

In an embodiment, the mapping of the plurality of candidate synchronization signal block indexes to the plurality of random access channel occasion groups is performed in the first period.

In an embodiment, the first period may refer to a PRACH configuration period.

In an embodiment, the first period may refer to an association period in which the plurality of candidate synchronization signal block indexes are mapped to the plurality of random access channel occasion groups.

In an embodiment, the first period may refer to an association pattern period including one or more association periods.

In an embodiment, the first period for mapping the plurality of candidate synchronization signal block indexes to the plurality of random access channel occasion groups is a minimum value in a set determined based on the PRACH configuration period.

In an embodiment, for the set determined based on the PRACH configuration period, reference may be made to Table 1, that is, the first period may be determined from Table 1.

TABLE 1

| PRACH configuration period (msec) | First period (quantity of PRACH configuration periods) |
|---|---|
| 10 | {1, 2, 4, 8, 16} |
| 20 | {1, 2, 4, 8} |
| 40 | {1, 2, 4} |
| 80 | {1, 2} |
| 160 | {1} |

In an embodiment, the first period may start from frame number 0.

As described above, the index of the first synchronization signal block, the first occasion group type, and the first mapping order are used to determine the first random access channel occasion group. The first occasion group type and the first mapping order are respectively described below.

The first occasion group type may include one or more types of the following information: a first repetition factor, a first frequency hopping indication, and a first frequency hopping pattern.

In an embodiment, the first occasion group type may include one type of the foregoing information, for example, include only the first repetition factor, or include only the first frequency hopping indication, or include only the first frequency hopping pattern.

In an embodiment, the first occasion group type may include multiple types of the foregoing information, for example, include the first repetition factor and the first frequency hopping indication; or include the first repetition factor and the first frequency hopping pattern; or include the first repetition factor, the first frequency hopping indication, and the first frequency hopping pattern; or the like.

In an embodiment, the first occasion group type may include other information in addition to one or more types of the foregoing information, which is not limited in the embodiments of the present application.

In an embodiment, the first occasion group type may include the first repetition factor, and a quantity of all random access channel occasions included in the first random access channel occasion group is equal to the first repetition factor. For example, if the first repetition factor is 4, the quantity of random access channel occasions included in the first random access channel occasion group is 4. In other words, the first random access channel occasion group includes four random access channel occasions.

In an embodiment, the first repetition factor is a positive integer. For example, the first repetition factor may be any positive integer, such as 2, 4, 8, or 16.

In an embodiment, the first repetition factor is predefined in a protocol or network configured.

In an embodiment, the first repetition factor may be one of 2 and 4.

In an embodiment, the first repetition factor may be one of 2, 4, and 8.

In an embodiment, the first repetition factor may be one of 1, 2, 4, and 8.

In an embodiment, a plurality of repetition factors are not equal.

In an embodiment, the first repetition factor is one of the plurality of repetition factors. The plurality of repetition factors may refer to repetition factors of preamble group transmission, namely, a quantity of repetition times of preamble transmissions.

In an embodiment, the plurality of repetition factors may include at least 2 and 4. For example, the plurality of repetition factors may include only 2 and 4; or the plurality of repetition factors may include 2, 4, and other positive integers.

In an embodiment, the plurality of repetition factors may include 2, 4, and 8.

In an embodiment, the plurality of repetition factors may include 1, 2, and 4.

In an embodiment, the plurality of repetition factors may include 1, 2, 4, and 8.

In an embodiment, the plurality of repetition factors may be 2 and 4, respectively.

In an embodiment, the plurality of repetition factors may be 2, 4, and 8, respectively.

In an embodiment, the plurality of repetition factors may be 1, 2, and 4, respectively.

In an embodiment, the plurality of repetition factors may be 1, 2, 4, and 8, respectively.

In an embodiment, a quantity of all random access channel occasions included in any random access channel occasion group in the plurality of random access channel occasion groups is equal to one of the plurality of repetition factors. For example, the plurality of repetition factors are 2 and 4, respectively. Any random access channel occasion group in the plurality of random access channel occasion groups includes either two random access channel occasions or four random access channel occasions.

In an embodiment, the plurality of candidate occasion group types may include a first candidate occasion group type and a second candidate occasion group type, and the first candidate occasion group type is different from the second candidate occasion group type.

In an embodiment, the first candidate occasion group type being different from the second candidate occasion group type may include that: a repetition factor included in the first candidate occasion group type is different from a repetition factor included in the second candidate occasion group type.

In an embodiment, when the first occasion group type belongs to different candidate occasion group types, the first repetition factor included in the first occasion group type are different. For example, when the first occasion group type is the first candidate occasion group type, the first repetition factor is one of the plurality of repetition factors; when the first occasion group type is the second candidate occasion group type, the first repetition factor is a repetition factor, in the plurality of repetition factors, other than the repetition factor included in the first candidate occasion group type. As a specific example, when the first occasion group type is the first candidate occasion group type, the first repetition factor may be 2; when the first occasion group type is the second candidate occasion group type, the first repetition factor may be 4.

In an embodiment, any random access channel occasion group in the plurality of random access channel occasion groups corresponds to one of the plurality of candidate occasion group types. For example, the plurality of random access channel occasion groups include four random access channel occasion groups A, B, C, and D, and the candidate occasion group type includes a first candidate occasion group type and a second candidate occasion group type, where the random access channel occasion group A and the random access channel occasion group B may correspond to the first candidate occasion group type, and the random access channel occasion group C and the random access channel occasion group D may correspond to the second candidate occasion group type.

In an embodiment, the plurality of candidate occasion group types respectively include the plurality of repetition factors. For example, the plurality of repetition factors include 2 and 4, the first candidate occasion group type in the plurality of candidate occasion group types may include the repetition factor 2, and the second candidate occasion group type may include the repetition factor 4.

In an embodiment, a quantity of all random access channel occasions included in a second random access channel occasion group is equal to a repetition factor included in a candidate occasion group type corresponding to the second random access channel occasion group, and the second random access channel occasion group is any random access channel occasion group in the plurality of random access channel occasion groups. For example, if the candidate occasion group type corresponding to the second random access channel occasion group is the first candidate occasion group type, and the first candidate occasion group type includes a repetition factor with 2, the quantity of random access channel occasions included in the second random access channel occasion group is equal to 2; if the candidate occasion group type corresponding to the second random access channel occasion group is the second candidate occasion group type, and the second candidate occasion group type includes a repetition factor with 4, the quantity of random access channel occasions included in the second random access channel occasion group is equal to 4.

In an embodiment, the plurality of candidate occasion group types respectively include the plurality of repetition factors, and the quantity of all random access channel occasions included in any random access channel occasion group in the plurality of random access channel occasion groups is equal to one repetition factor in the plurality of repetition factors. For example, the quantity of all random access channel occasions included in any random access channel occasion group in the plurality of random access channel occasion groups may be equal to one of 1, 2, 4, and 8.

In an embodiment, the first occasion group type may include a first frequency hopping indication. The first frequency hopping indication may be used to determine whether frequency resources occupied by at least two random access channel occasions in the first random access channel occasion group are different. In other words, the first frequency hopping indication may be used to determine whether frequency resources occupied by at least two random access channel occasions in the first random access channel occasion group are the same.

In an embodiment, the plurality of candidate occasion group types may include a first candidate occasion group type and a second candidate occasion group type, and the first candidate occasion group type is different from the second candidate occasion group type.

In an embodiment, the first candidate occasion group type being different from the second candidate occasion group type may include that: a frequency hopping indication included in the first candidate occasion group type is different from a frequency hopping indication included in the second candidate occasion group type.

In an embodiment, when the first occasion group type belongs to different candidate occasion group types, the frequency hopping indication included in the first occasion group type indicates different information. For example, when the first occasion group type is the first candidate occasion group type, the first frequency hopping indication may be used to indicate that frequency resources occupied by all random access channel occasions in the first random access channel occasion group are the same; when the first occasion group type is the second candidate occasion group type, the first frequency hopping indication may be used to indicate that frequency resources occupied by at least two random access channel occasions in the first random access channel occasion group are different.

In an embodiment, the first occasion group type may include a first frequency hopping pattern. The first frequency hopping pattern is used to determine a frequency resource occupied by any random access channel occasion in the first random access channel occasion group.

In an embodiment, the frequency resource occupied by any random access channel occasion in the first random access channel occasion group corresponds to the first frequency hopping pattern.

In an embodiment, the plurality of candidate occasion group types may include a first candidate occasion group type and a second candidate occasion group type, and the first candidate occasion group type is different from the second candidate occasion group type.

In an embodiment, the first candidate occasion group type being different from the second candidate occasion group type may include that: a frequency hopping pattern included in the first candidate occasion group type is different from a frequency hopping pattern included in the second candidate occasion group type.

In an embodiment, when the first occasion group type belongs to different candidate occasion group types, patterns of the first frequency hopping pattern included in the first occasion group type are different. For example, when the first occasion group type belongs to the first candidate occasion group type, the first frequency hopping pattern included in the first occasion group type is a frequency hopping pattern A; when the first occasion group type belongs to the second candidate occasion group type, the first frequency hopping pattern included in the first occasion group type is a frequency hopping pattern B, where the frequency hopping pattern A is at least partially different from the frequency hopping pattern B.

In an embodiment, the plurality of candidate occasion group types may include a plurality of frequency hopping patterns. A frequency resource occupied by any random access channel occasion group in the plurality of random access channel occasion groups corresponds to one frequency hopping pattern in the plurality of frequency hopping patterns.

In an embodiment, any random access channel occasion group in the plurality of random access channel occasion groups corresponds to one of a plurality of candidate occasion group types. The plurality of candidate occasion group types include a plurality of frequency hopping patterns, and a frequency resource occupied by any random access channel occasion group in the plurality of random access channel occasion groups corresponds to one frequency hopping pattern in the plurality of frequency hopping patterns.

In an embodiment, the first occasion group type is one of the plurality of candidate occasion group types, and thus the plurality of candidate occasion group types may include one or more of the following information: a repetition factor, a frequency hopping indication, and a frequency hopping pattern. The specific content of the information included in the plurality of candidate occasion group types is similar to information included in the first occasion group type, and for specific description, reference may be made to the description of the information included in the first occasion group type. For brevity, details are not described herein again.

In the embodiments of the present application, a plurality of random access channel occasions are grouped into a plurality of random access channel occasion groups by using a plurality of candidate occasion group types (for example, a plurality of repetition factors), so that a quantity of random access channel occasions occupied by preamble group transmission is variable.

The first mapping order is described in detail below.

In an embodiment, the first mapping order is associated with one or more of the following information: a preamble index within a random access channel occasion group, frequency resources of a plurality of random access channel occasion groups, and time domain resources of a plurality of random access channel occasion groups.

In an embodiment, the first mapping order may include: in a variation order of preamble indexes within one random access channel occasion group in the plurality of random access channel occasion groups, for example, in an increasing order of the preamble indexes or a decreasing order of the preamble indexes. In other words, a plurality of candidate synchronization signal block indexes may be arranged in a variation order (such as an increasing order) of preamble indexes within one random access channel occasion group in the plurality of random access channel occasion groups.

In an embodiment, the first mapping order may include: in a variation order of frequency resources of the plurality of random access channel occasion groups, for example, in an increasing order of the frequency resources or a decreasing order of the frequency resources. In other words, a plurality of candidate synchronization signal block indexes may be arranged in a variation order (such as an increasing order) of frequency resources of the plurality of random access channel occasion groups for frequency multiplexed multiple random access channel occasion groups.

In an embodiment, the first mapping order may include: in a variation order of time domain resources of the plurality of random access channel occasion groups, for example, in an increasing order of the time domain resources or a decreasing order of the time domain resources. In other words, a plurality of candidate synchronization signal block indexes may be arranged in a variation order (such as an increasing order) of time domain resources of the plurality of random access channel occasion groups for time multiplexed multiple random access channel occasion groups.

In an embodiment, the first mapping order may include one or more of the following orders: an increasing order of preamble indexes within one random access channel occasion group in the plurality of random access channel occasion groups; an increasing order of frequency resources for the plurality of random access channel occasion groups; and an increasing order of time domain resources for the plurality of random access channel occasion groups.

In an embodiment, the first mapping order may include: first, in the increasing order of preamble indexes within one random access channel occasion group in the plurality of random access channel occasion groups; second, in the increasing order of frequency resources for the plurality of random access channel occasion groups; and third, in the increasing order of time domain resources for the plurality of random access channel occasion groups.

However, the embodiments of the present application are not limited thereto, the foregoing orders included in the first mapping order may be randomly arranged and combined, and a sequence of the foregoing orders may also be changed. For example, the first mapping order may include: first, in the increasing order of preamble indexes within one random access channel occasion group in the plurality of random access channel occasion groups; second, in the increasing order of time domain resources for the plurality of random access channel occasion groups; and third, in the increasing order of frequency resources for the plurality of random access channel occasion groups, and so on.

In an embodiment, the plurality of random access channel occasion groups may include a plurality of random access channel occasions, and each random access channel occasion in the plurality of random access channel occasions included in the plurality of random access channel occasion groups may belong to only one random access channel occasion group in the plurality of random access channel occasion groups. In other words, the plurality of random access channel occasion groups are not repeated, that is, resources (for example, random access channel occasions) occupied by the plurality of random access channel occasion groups do not overlap.

An example in which each random access channel occasion in the plurality of random access channel occasions belongs to only one random access channel occasion group is provided below with reference to FIG. 4.

Figure 4:
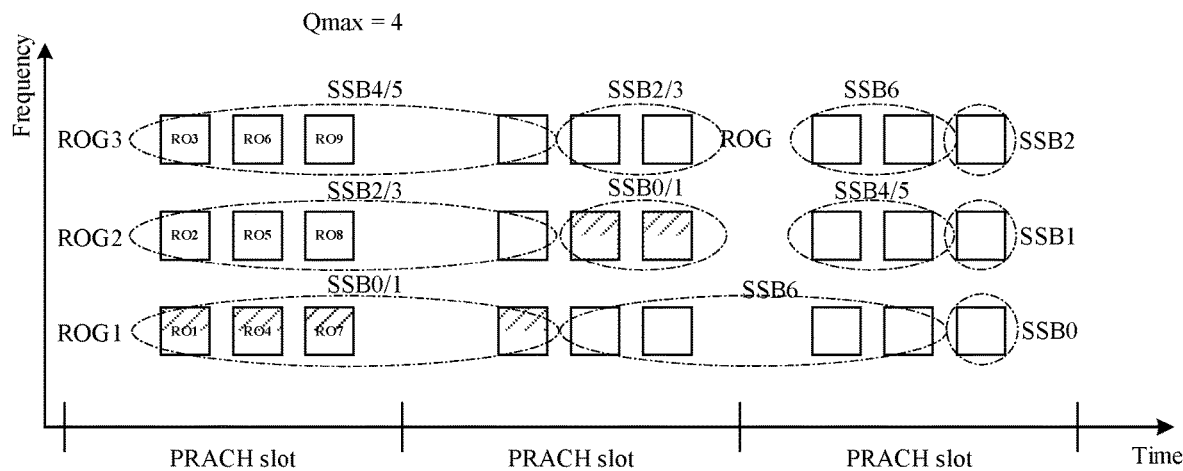
FIG. 4 is an example diagram of a mapping relationship between a synchronization signal block and a random access channel occasion group according to an embodiment of the present application.

As shown in FIG. 4, it is assumed that a plurality of repetition factors included in a plurality of candidate occasion group types are 1, 2, and 4, respectively, where 4 is a maximum repetition factor Qmax, or a maximum repetition factor Qmax for preamble group transmission is 4. As an implementation, in a first period, all random access channel occasions within the first period may be classified into a plurality of random access channel occasion groups sequentially according to a plurality of repetition factors included in the plurality of candidate occasion group types.

In the example illustrated in FIG. 4, all random access channel occasions in the first period are classified into a plurality of random access channel occasion groups sequentially in a decreasing order of the plurality of repetition factors included in the plurality of candidate occasion group types.

In the example illustrated in FIG. 4, each dashed box represents a random access channel occasion group, and the random access channel occasion groups are obtained sequentially through classification in a decreasing order of the plurality of repetition factors (1, 2, and 4).

In the example illustrated in FIG. 4, the plurality of random access channel occasion groups includes a plurality of random access channel occasions. Any random access channel occasion included in the plurality of random access channel occasion groups belongs to only one random access channel occasion group. For example, a random access channel occasion 1 (RO 1 in the figure) belongs to only one random access channel occasion group (ROG 1 in the figure), and a random access channel occasion 8 (RO 8 in the figure) belongs to only one random access channel occasion group (ROG 2 in the figure), and so on.

In the example illustrated in FIG. 4, the plurality of random access channel occasion groups includes a plurality of random access channel occasions. For each random access channel occasion included in the plurality of random access channel occasion groups, different candidate synchronization signal block indexes are mapped to different preambles in a plurality of preambles included in the each random access channel occasion. For example, a random access channel occasion 1 is used as an example, and both a candidate synchronization signal block index 0 and a candidate synchronization signal block index 1 are mapped to the random access channel occasion 1, but the candidate synchronization signal block index 0 and the candidate synchronization signal block index 1 are mapped to different preambles in the random access channel occasion 1. For example, the candidate synchronization signal block index 0 is mapped to preambles 0-21 in the random access channel occasion 1, and the candidate synchronization signal block index 1 is mapped to preambles 22-43 in the random access channel occasion 1.

In an embodiment, the plurality of random access channel occasion groups may include a plurality of random access channel occasions, and each random access channel occasion in the plurality of random access channel occasions included in the plurality of random access channel occasion groups may be shared by at least two random access channel occasion groups in the plurality of random access channel occasion groups. In other words, resources (for example, random access channel occasions) occupied by the plurality of random access channel occasion groups may possibly overlap.

An example in which each random access channel occasion in the plurality of random access channel occasions is shared by at least two random access channel occasion groups in the plurality of random access channel occasion groups is provided below with reference to FIG. 5.

Figure 5:
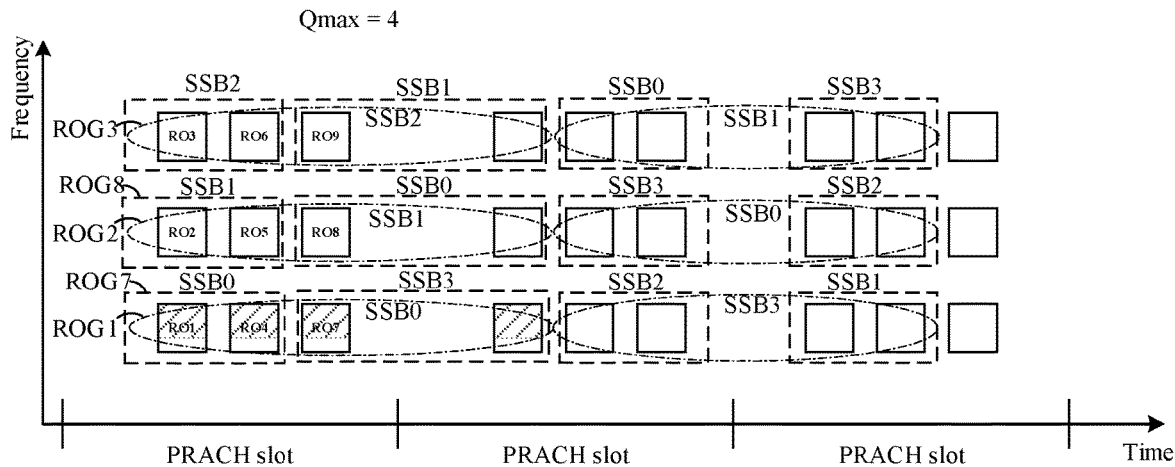
FIG. 5 is an example diagram of a mapping relationship between a synchronization signal block and a random access channel occasion group according to another embodiment of the present application.

As shown in FIG. 5, it is assumed that a plurality of repetition factors included in a plurality of candidate occasion group types are 1, 2, and 4, respectively, where 4 is a maximum repetition factor Qmax, or a maximum repetition factor Qmax for preamble group transmission is 4. As an implementation, in a first period, all random access channel occasions within the first period may be classified into a plurality of random access channel occasion groups according to a plurality of repetition factors included in the plurality of candidate occasion group types.

In the example illustrated in FIG. 5, all random access channel occasions in the first period are classified into a plurality of random access channel occasion groups according to the plurality of repetition factors included in the plurality of candidate occasion group types.

In the example illustrated in FIG. 5, each dashed box represents a random access channel occasion group, and the random access channel occasion groups are obtained through classification according to the plurality of repetition factors (1, 2, and 4). A dashed elliptical box and a dashed square box respectively represent a random access channel occasion group obtained through classification according to different repetition factors. For example, a dashed elliptical box represents a random access channel occasion group obtained through classification according to a repetition factor of 4, and a dashed square box represents a random access channel occasion group obtained through classification according to a repetition factor of 2.

In the example illustrated in FIG. 5, the plurality of random access channel occasion groups includes a plurality of random access channel occasions. Any random access channel occasion included in the plurality of random access channel occasion groups is shared by at least two random access channel occasion groups in the plurality of random access channel occasion groups. For example, a random access channel occasion 1 (RO 1 in the figure) is shared by two random access channel occasion groups (ROG 1 and ROG 7 in the figure), and a random access channel occasion 8 (RO 8 in the figure) is shared by two random access channel occasion groups (ROG 2 and ROG 8 in the figure), and so on.

In the example illustrated in FIG. 5, the plurality of random access channel occasion groups includes a plurality of random access channel occasions. For each random access channel occasion included in the plurality of random access channel occasion groups, at least two random access channel occasion groups that share the random access channel occasion are mapped to different preambles in the plurality of preambles included in the random access channel occasion. For example, a random access channel occasion 1 is used as an example, a random access channel occasion group 1 and a random access channel occasion group 7 share the random access channel occasion 1 and both are mapped to the random access channel occasion 1. However, the random access channel occasion group 1 and the random access channel occasion group 7 are mapped to different preambles in the random access channel occasion 1, for example, the random access channel occasion group 1 is mapped to preambles 0-21 in the random access channel occasion 1, and the random access channel occasion group 7 is mapped to preambles 22-43 in the random access channel occasion 1.

Figure 6:
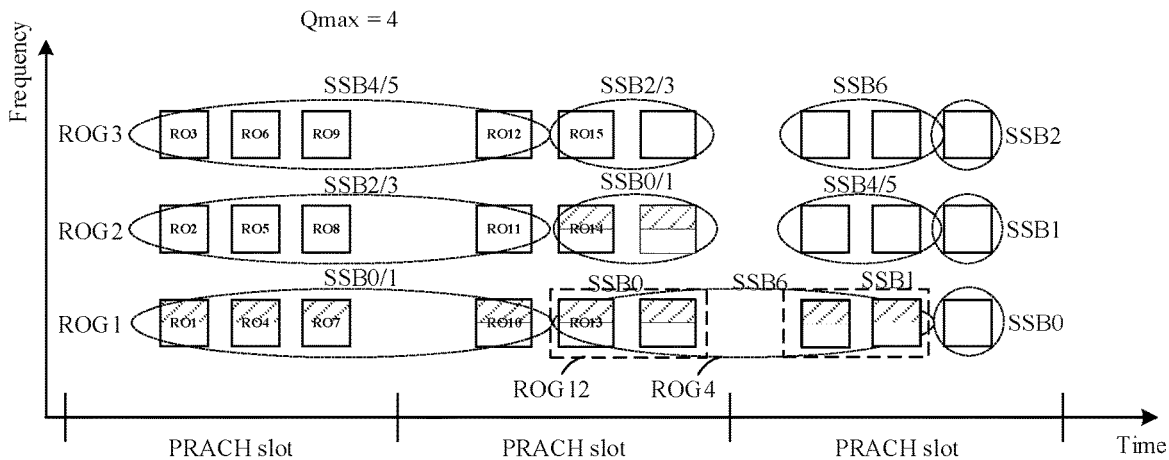
FIG. 6 is an example diagram of a mapping relationship between a synchronization signal block and a random access channel occasion group according to still another embodiment of the present application.

FIG. 6 illustrates another example in which each random access channel occasion in the plurality of random access channel occasions is shared by at least two random access channel occasion groups in the plurality of random access channel occasion groups. The solution illustrated in FIG. 6 may be understood as a combination (or mixture) of the implementations illustrated in FIG. 4 and FIG. 5.

As shown in FIG. 6, it is assumed that a plurality of repetition factors included in a plurality of candidate occasion group types are 1, 2, and 4, respectively, where 4 is a maximum repetition factor Qmax; in other words, a maximum repetition factor Qmax for preamble group transmission is 4. As an implementation, in a first period, all random access channel occasions within the first period may be classified into a plurality of random access channel occasion groups sequentially according to a plurality of repetition factors included in the plurality of candidate occasion group types (that is, first being classified into a plurality of random access channel occasion groups according to the implementation illustrated in FIG. 4). Then, in the plurality of random access channel occasion groups, for a random access channel occasion group in which preambles are not used up, a further classification is performed on the random access channel occasion group in which preambles are not used up. Candidate occasion group types (for example, repetition factors) corresponding to the two times of classification are different. For example, the further classification may be performed according to the implementation illustrated in FIG. 5.

In the example illustrated in FIG. 6, each dashed box represents a random access channel occasion group, where the dashed elliptical boxes represent a plurality of random access channel occasion groups obtained first through classification sequentially according to a plurality of repetition factors included in the plurality of candidate occasion group types, and the dashed square boxes represent random access channel occasion groups obtained through further classification for random access channel occasion groups in which preambles are not used up.

In the example illustrated in FIG. 6, the plurality of random access channel occasion groups includes a plurality of random access channel occasions. Any random access channel occasion included in the plurality of random access channel occasion groups may belong to only one random access channel occasion group, or may be shared by at least two random access channel occasion groups in the plurality of random access channel occasion groups. For example, a random access channel occasion 1 (RO 1 in the figure) belongs to only the random access channel occasion group 1 (ROG 1 in the figure), and a random access channel occasion 13 (RO 13 in the figure) is shared by two random access channel occasion groups (ROG 4 and ROG 12 in the figure), and so on.

In the example illustrated in FIG. 6, the plurality of random access channel occasion groups includes a plurality of random access channel occasions. For each random access channel occasion included in the plurality of random access channel occasion groups, if the random access channel occasion belongs to only one random access channel occasion group, different candidate synchronization signal block indexes may be mapped to different preambles in a plurality of preambles included in the each random access channel occasion. For example, a random access channel occasion 1 is used as an example, and both a candidate synchronization signal block index 0 and a candidate synchronization signal block index 1 are mapped to the random access channel occasion 1, but the candidate synchronization signal block index 0 and the candidate synchronization signal block index 1 are mapped to different preambles in the random access channel occasion 1. For example, the candidate synchronization signal block index 0 is mapped to preambles 0-21 in the random access channel occasion 1, and the candidate synchronization signal block index 1 is mapped to preambles 22-43 in the random access channel occasion 1. If the random access channel occasion is shared by at least two random access channel occasion groups, the at least two random access channel occasion groups that share the random access channel occasion may be mapped to different preambles in the plurality of preambles included in the random access channel occasion. For example, a random access channel occasion 13 is used as an example, a random access channel occasion group 4 and a random access channel occasion group 12 share the random access channel occasion 13 and both are mapped to the random access channel occasion 13. However, the random access channel occasion group 4 and the random access channel occasion group 12 are mapped to different preambles in the random access channel occasion 13, for example, the random access channel occasion group 4 is mapped to preambles 0-21 in the random access channel occasion 13, and the random access channel occasion group 12 is mapped to preambles 22-43 in the random access channel occasion 13.

Figure 7:
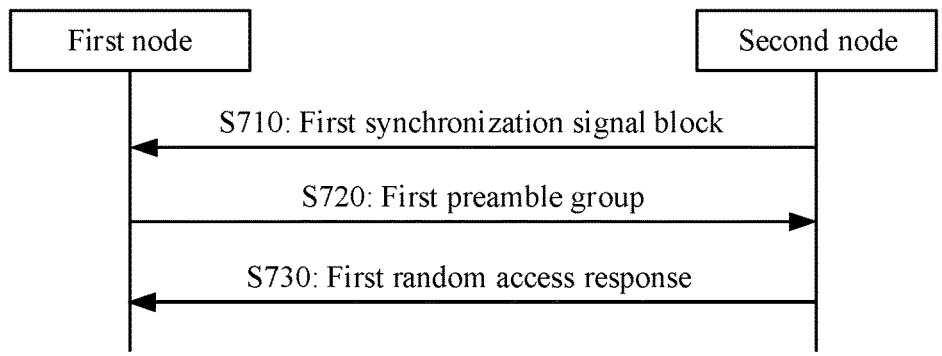
FIG. 7 is a schematic flowchart of a method used for wireless communication according to another embodiment of the present application.

FIG. 7 is a schematic flowchart of a method for a node used for wireless communication according to another embodiment of the present application. The method illustrated in FIG. 7 may include Step S710 to Step S730.

In Step S710, a first node receives a first synchronization signal block.

In Step S720, the first node transmits a first preamble group.

For related descriptions of Step S710 and Step S720, reference may be made to the foregoing descriptions of Step S310 and Step S320, and details are not described herein.

In Step S730, the first node receives a first random access response in a first time window in response to transmitting the first preamble group.

In an embodiment, a first random access channel occasion group may be used to determine one or more of the following: determining a start of the first time window, and determining a scrambling sequence of the first random access response.

In a specific embodiment, the first random access channel occasion group is used for determining the start of the first time window.

In another specific embodiment, the first random access channel occasion group is used for determining the start of the first time window and the scrambling sequence of the first random access response.

The methods embodiments of the present application are described in detail above with reference to FIG. 1 to FIG. 7. The apparatus embodiments of the present application are described in detail below with reference to FIG. 8 to FIG. 10. It should be understood that, the description of the method embodiments corresponds to the description of the apparatus embodiments, and therefore, for parts that are not described in detail, reference may be made to the foregoing method embodiments.

Figure 8:
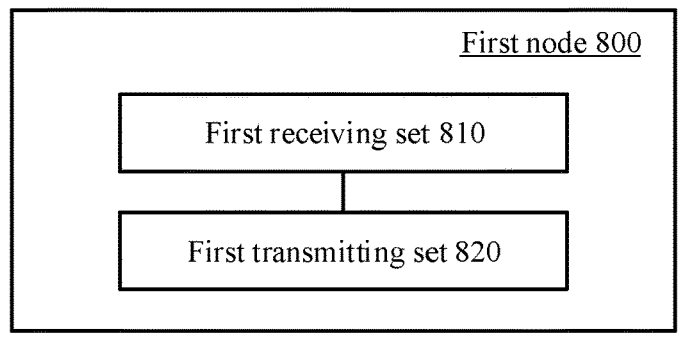
FIG. 8 is a schematic structural diagram of a first node according to an embodiment of the present application.

FIG. 8 is a schematic structural diagram of a first node according to an embodiment of the present application. A first node 800 shown in FIG. 8 may include a first receiving set 810 and a first transmitting set 820.

The first receiving set 810 may be configured to receive a first synchronization signal block, where an index of the first synchronization signal block is one of a plurality of candidate synchronization signal block indexes.

The first transmitting set 820 may be configured to transmit a first preamble group, where the first preamble group includes a plurality of preambles. A first random access channel occasion group includes a plurality of random access channel occasions, and the plurality of random access channel occasions in the first random access channel occasion group are used for transmitting the plurality of preambles in the first preamble group. Any two random access channel occasions in the first random access channel occasion group are orthogonal in time domain. The plurality of candidate synchronization signal block indexes are mapped to a plurality of random access channel occasion groups in a first mapping order, and the first random access channel occasion group is one of the plurality of random access channel occasion groups. The first random access channel occasion group corresponds to a first occasion group type, and the first occasion group type is one of a plurality of candidate occasion group types. The index of the first synchronization signal block, the first occasion group type, and the first mapping order are used to determine the first random access channel occasion group.

In an embodiment, any random access channel occasion group in the plurality of random access channel occasion groups is in a first period.

In an embodiment, the first occasion group type includes a first repetition factor, a quantity of random access channel occasions included in the first random access channel occasion group is equal to the first repetition factor, and the first repetition factor is one of a plurality of repetition factors.

In an embodiment, any random access channel occasion group in the plurality of random access channel occasion groups corresponds to one of the plurality of candidate occasion group types. The plurality of candidate occasion group types respectively include the plurality of repetition factors, and a quantity of random access channel occasions included in a second random access channel occasion group is equal to a repetition factor included in a candidate occasion group type corresponding to the second random access channel occasion group. The second random access channel occasion group is any random access channel occasion group in the plurality of random access channel occasion groups.

In an embodiment, the first occasion group type includes a first frequency hopping indication; and the first frequency hopping indication is used to determine whether frequency resources occupied by at least two random access channel occasions in the first random access channel occasion group are different.

In an embodiment, the first occasion group type includes a first frequency hopping pattern; and a frequency resource occupied by any random access channel occasion in the first random access channel occasion group corresponds to the first frequency hopping pattern.

In an embodiment, the index of the first synchronization signal block, the first occasion group type, and the first mapping order being used to determine the first random access channel occasion group includes that: the index of the first synchronization signal block is mapped to at least two random access channel occasion groups in the plurality of random access channel occasion groups according to the first mapping order, the at least two random access channel occasion groups respectively correspond to at least two different candidate occasion group types, and the first occasion group type is used to determine the first random access channel occasion group from the at least two random access channel occasion groups.

In an embodiment, the index of the first synchronization signal block, the first occasion group type, and the first mapping order being used to determine the first random access channel occasion group includes that: the first occasion group type is used to determine at least L random access channel occasion groups from the plurality of random access channel occasion groups, and the index of the first synchronization signal block and the first mapping order are used to determine the first random access channel occasion group from the at least L random access channel occasion groups, where L is a positive integer greater than 1.

In an embodiment, the first mapping order includes one or more of the following orders: an increasing order of preamble indexes within one random access channel occasion group in the plurality of random access channel occasion groups; an increasing order of frequency resources for the plurality of random access channel occasion groups; and an increasing order of time domain resources for the plurality of random access channel occasion groups.

In an embodiment, the first mapping order includes: first, in the increasing order of preamble indexes within one random access channel occasion group in the plurality of random access channel occasion groups; second, in the increasing order of frequency resources for the plurality of random access channel occasion groups; and third, in the increasing order of time domain resources for the plurality of random access channel occasion groups.

In an embodiment, the plurality of random access channel occasion groups include a plurality of random access channel occasions, and each random access channel occasion in the plurality of random access channel occasions included in the plurality of random access channel occasion groups belongs to only one random access channel occasion group in the plurality of random access channel occasion groups; or the each random access channel occasion is shared by at least two random access channel occasion groups in the plurality of random access channel occasion groups.

In an embodiment, at least two random access channel occasions in at least one random access channel occasion group in the plurality of random access channel occasion groups are in two different slots.

In an embodiment, the first node 800 further includes: a second receiving set, configured to receive a first random access response in a first time window in response to transmitting the first preamble group. The first random access channel occasion group is used to determine a start of the first time window; and the first random access channel occasion group is used to determine a scrambling sequence for the first random access response.

Figure 10:
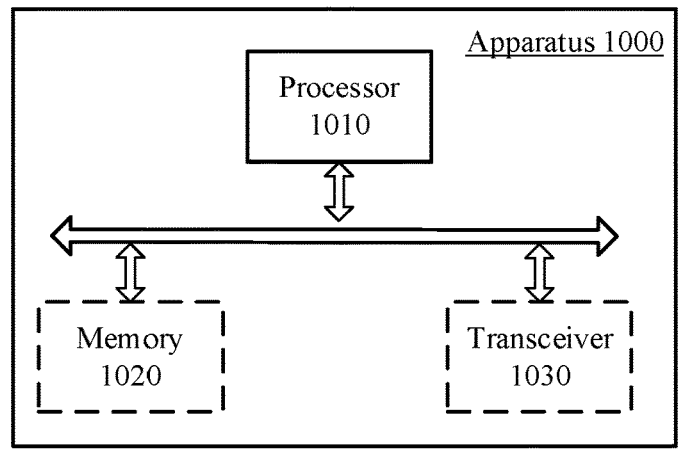
FIG. 10 is a schematic structural diagram of a communications apparatus according to an embodiment of the present application.

In an embodiment, the first receiving set 810 and the first transmitting set 820 may be a transceiver 1030. The first node 800 may further include a processor 1010 and a memory 1020, as shown in FIG. 10.

Figure 9:
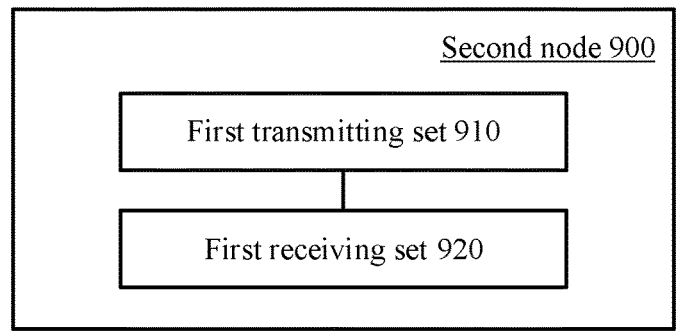
FIG. 9 is a schematic structural diagram of a second node according to an embodiment of the present application.

FIG. 9 is a schematic structural diagram of a second node according to an embodiment of the present application. A second node 900 shown in FIG. 9 may include a first transmitting set 910 and a first receiving set 920.

The first transmitting set 910 may be configured to transmit one or more synchronization signal blocks, where a first synchronization signal block is one of the one or more synchronization signal blocks, and an index of the first synchronization signal block is one of a plurality of candidate synchronization signal block indexes.

The first receiving set 920 may be configured to receive a first preamble group, where the first preamble group includes a plurality of preambles. A first random access channel occasion group includes a plurality of random access channel occasions, and the plurality of random access channel occasions in the first random access channel occasion group are used for transmitting the plurality of preambles in the first preamble group. Any two random access channel occasions in the first random access channel occasion group are orthogonal in time domain. The plurality of candidate synchronization signal block indexes are mapped to a plurality of random access channel occasion groups in a first mapping order, and the first random access channel occasion group is one of the plurality of random access channel occasion groups. The first random access channel occasion group corresponds to a first occasion group type, and the first occasion group type is one of a plurality of candidate occasion group types. The index of the first synchronization signal block, the first occasion group type, and the first mapping order are used to determine the first random access channel occasion group.

In an embodiment, any random access channel occasion group in the plurality of random access channel occasion groups is in a first period.

In an embodiment, the first occasion group type includes a first repetition factor, a quantity of random access channel occasions included in the first random access channel occasion group is equal to the first repetition factor, and the first repetition factor is one of a plurality of repetition factors.

In an embodiment, any random access channel occasion group in the plurality of random access channel occasion groups corresponds to one of the plurality of candidate occasion group types. The plurality of candidate occasion group types respectively include the plurality of repetition factors, and a quantity of random access channel occasions included in a second random access channel occasion group is equal to a repetition factor included in a candidate occasion group type corresponding to the second random access channel occasion group. The second random access channel occasion group is any random access channel occasion group in the plurality of random access channel occasion groups.

In an embodiment, the first occasion group type includes a first frequency hopping indication; and the first frequency hopping indication is used to determine whether frequency resources occupied by at least two random access channel occasions in the first random access channel occasion group are different.

In an embodiment, the first occasion group type includes a first frequency hopping pattern; and a frequency resource occupied by any random access channel occasion in the first random access channel occasion group corresponds to the first frequency hopping pattern.

In an embodiment, the index of the first synchronization signal block, the first occasion group type, and the first mapping order being used to determine the first random access channel occasion group includes that: the index of the first synchronization signal block is mapped to at least two random access channel occasion groups in the plurality of random access channel occasion groups according to the first mapping order, the at least two random access channel occasion groups respectively correspond to at least two different candidate occasion group types, and the first occasion group type is used to determine the first random access channel occasion group from the at least two random access channel occasion groups.

In an embodiment, the index of the first synchronization signal block, the first occasion group type, and the first mapping order being used to determine the first random access channel occasion group includes that: the first occasion group type is used to determine at least L random access channel occasion groups from the plurality of random access channel occasion groups, and the index of the first synchronization signal block and the first mapping order are used to determine the first random access channel occasion group from the at least L random access channel occasion groups, where L is a positive integer greater than 1.

In an embodiment, the first mapping order includes one or more of the following orders: an increasing order of preamble indexes within one random access channel occasion group in the plurality of random access channel occasion groups; an increasing order of frequency resources for the plurality of random access channel occasion groups; and an increasing order of time domain resources for the plurality of random access channel occasion groups.

In an embodiment, the first mapping order includes: first, in the increasing order of preamble indexes within one random access channel occasion group in the plurality of random access channel occasion groups; second, in the increasing order of frequency resources for the plurality of random access channel occasion groups; and third, in the increasing order of time domain resources for the plurality of random access channel occasion groups.

In an embodiment, the plurality of random access channel occasion groups include a plurality of random access channel occasions, and each random access channel occasion in the plurality of random access channel occasions included in the plurality of random access channel occasion groups belongs to only one random access channel occasion group in the plurality of random access channel occasion groups; or the each random access channel occasion is shared by at least two random access channel occasion groups in the plurality of random access channel occasion groups.

In an embodiment, at least two random access channel occasions in at least one random access channel occasion group in the plurality of random access channel occasion groups are in two different slots.

In an embodiment, the second node 900 includes: a second transmitting set, configured to transmit a first random access response in a first time window in response to receiving the first preamble group. The first random access channel occasion group is used to determine a start of the first time window; and the first random access channel occasion group is used to determine a scrambling sequence for the first random access response.

In an embodiment, the first transmitting set 910 and the first receiving set 920 may be a transceiver 1030. The second node 900 may further include a processor 1010 and a memory 1020, as shown in FIG. 10.

FIG. 10 is a schematic structural diagram of a communications apparatus according to an embodiment of the present application. The dashed lines in FIG. 10 indicate that the unit or module is optional. The apparatus 1000 may be configured to implement the methods described in the foregoing method embodiments. The apparatus 1000 may be a chip, a UE, or a network device.

The apparatus 1000 may include one or more processors 1010. The processor 1010 may allow the apparatus 1000 to implement the methods described in the foregoing method embodiments. The processor 1010 may be a general-purpose processor or a dedicated processor. For example, the processor may be a central processing unit (CPU). Alternatively, the processor may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

The apparatus 1000 may further include one or more memories 1020. The memory 1020 stores a program that may be executed by the processor 1010 to cause the processor 1010 to perform the methods described in the foregoing method embodiments. The memory 1020 may be independent of the processor 1010 or may be integrated into the processor 1010.

The apparatus 1000 may further include a transceiver 1030. The processor 1010 may communicate with another device or chip through the transceiver 1030. For example, the processor 1010 may transmit and receive data to and from another device or chip through the transceiver 1030.

For ease of understanding, hardware modules of communications devices of the first node and the second node are briefly described below.

Figure 11:
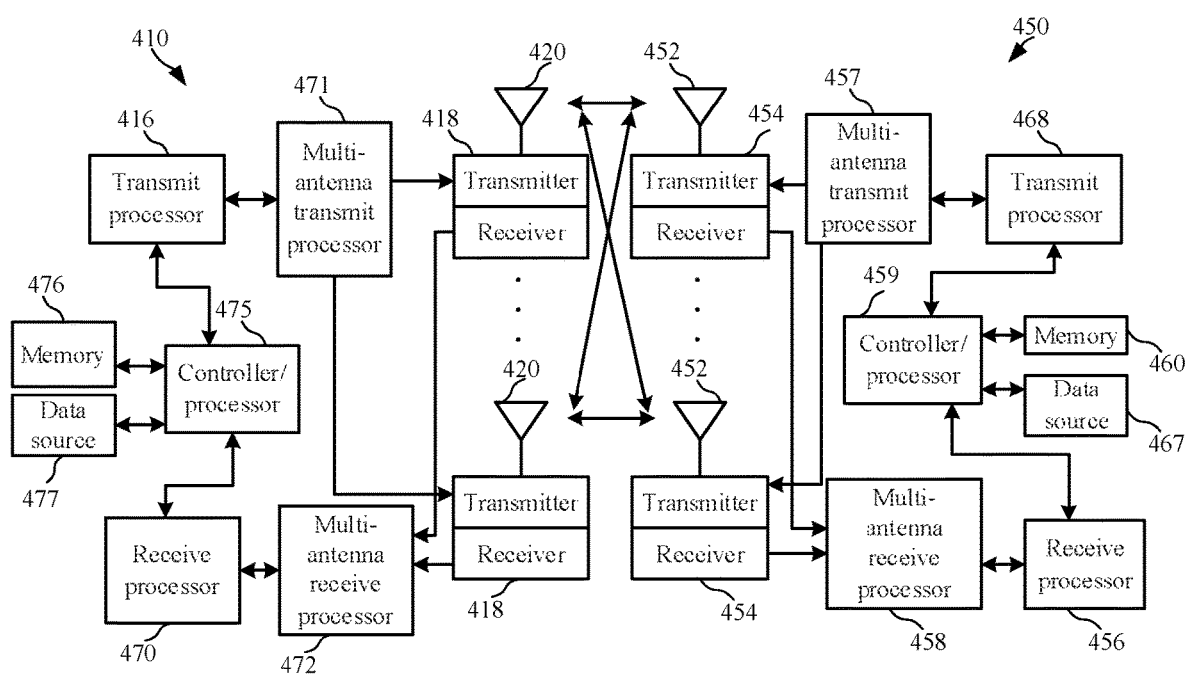
FIG. 11 is a schematic diagram of hardware modules of a communications device according to an embodiment of the present application.

Referring to FIG. 11, FIG. 11 is a schematic diagram of hardware modules of a communications device according to an embodiment of the present application. Specifically, FIG. 11 is a block diagram of a first communications device 450 and a second communications device 410 communicating with each other in an access network.

The first communications device 450 includes a controller/processor 459, a memory 460, a data source 467, a transmit processor 468, a receive processor 456, a multi-antenna transmit processor 457, a multi-antenna receive processor 458, transmitters/receivers 454, and antennas 452.

The second communications device 410 includes a controller/processor 475, a memory 476, a data source 477, a receive processor 470, a transmit processor 416, a multi-antenna receive processor 472, a multi-antenna transmit processor 471, transmitters/receivers 418, and antennas 420.

In transmission from the second communications device 410 to the first communications device 450, at the second communications device 410, an upper layer data packet from a core network or an upper layer data packet from the data source 477 are provided to the controller/processor 475. The core network and the data source 477 represent all protocol layers above an L2 layer. The controller/processor 475 implements functions of the L2 layer. In transmission from the second communications device 410 to the first communications device 450, the controller/processor 475 provides header compression, encryption, packet segmentation and reordering, multiplexing between a logical channel and a transport channel, and allocation to radio resources of the first communications device 450 based on various priority measurements. The controller/processor 475 is further responsible for retransmission of a lost packet, and signaling to the first communications device 450. The transmit processor 416 and the multi-antenna transmit processor 471 implement various signal processing functions of an L1 layer (namely, a physical layer). The transmit processor 416 implements encoding and interleaving to facilitate forward error correction at the second communications device 410, and mapping of signal clusters based on various modulation schemes (such as binary phase shift keying, quadrature phase shift keying, M-phase shift keying, and M-quadrature amplitude modulation). The multi-antenna transmit processor 471 performs digital space precoding, including codebook-based precoding and non-codebook-based precoding, on a coded and modulated symbol, and performs beamforming processing, to generate one or more spatial streams. The transmit processor 416 then maps each spatial stream to a subcarrier, multiplexes the mapped spatial stream with a reference signal (for example, a pilot) in time domain and/or frequency domain, and then uses an inverse fast Fourier transform to generate a physical channel that carries a time-domain multi-carrier symbol stream. Subsequently, the multi-antenna transmit processor 471 performs an operation of analog precoding transmitting/beamforming on the time-domain multi-carrier symbol stream. Each transmitter 418 converts a baseband multi-carrier symbol stream provided by the multi-antenna transmit processor 471 into a radio frequency stream, and then provides the radio frequency stream to different antennas 420.

In the transmission from the second communications device 410 to the first communications device 450, at the first communications device 450, each receiver 454 receives a signal through its corresponding antenna 452. Each receiver 454 recovers information modulated onto a radio frequency carrier, converts a radio frequency stream into a baseband multi-carrier symbol stream, and provides the baseband multi-carrier symbol stream to the receive processor 456. The receive processor 456 and the multi-antenna receive processor 458 implement various signal processing functions of the L1 layer. The multi-antenna receive processor 458 performs an operation of analog precoding receiving/beamforming on the baseband multi-carrier symbol stream from the receiver 454. The receive processor 456 converts, from time domain to frequency domain via fast Fourier transform, the baseband multi-carrier symbol stream obtained after the operation of analog precoding receiving/beamforming. In frequency domain, a physical-layer data signal and a reference signal are demultiplexed by the receive processor 456. The reference signal is used for channel estimation; and the data signal is recovered after multi-antenna detection performed by the multi-antenna receive processor 458, to obtain any spatial stream that uses the first communications device 450 as a destination. Symbols on each spatial stream are demodulated and recovered in the receive processor 456, and a soft decision is generated. The receive processor 456 then decodes and de-interleaves the soft decision to recover upper layer data and a control signal transmitted by the second communications device 410 on a physical channel. The upper layer data and the control signal are then provided to the controller/processor 459. The controller/processor 459 implements functions of the L2 layer. The controller/processor 459 may be associated with the memory 460 that stores program codes and data. The memory 460 may be referred to as a computer-readable medium. In the transmission from the second communications device 410 to the first communications device 450, the controller/processor 459 provides demultiplexing between a transport channel and a logical channel, packet reassembly, decryption, header decompression, and control signal processing, to recover an upper layer data packet from the second communications device 410. The upper layer packet is then provided to all protocol layers above the L2 layer, or various control signals may be provided to the L3 layer for processing by the L3 layer.

In transmission from the first communications device 450 to the second communications device 410, at the first communications device 450, an upper layer data packet is provided to the controller/processor 459 by using the data source 467. The data source 467 represents all protocol layers above the L2 layer. Similar to the transmit function at the second communications device 410 described in the transmission from the second communications device 410 to the first communications device 450, the controller/processor 459 implements header compression, encryption, packet segmentation and reordering, and multiplexing between a logical channel and a transport channel, to implement L2 layer functions for a user plane and a control plane. The controller/processor 459 is further responsible for retransmission of a lost packet, and signaling to the second communications device 410. The transmit processor 468 performs modulation and mapping, and channel coding processing. The multi-antenna transmit processor 457 performs digital multi-antenna spatial precoding, including codebook-based precoding and non-codebook-based precoding, and beamforming processing. Then the transmit processor 468 modulates a generated spatial stream into a multi-carrier/single-carrier symbol stream, and the multi-carrier/single-carrier symbol stream is provided to different antennas 452 via the transmitter 454 after undergoing an analog precoding/beamforming operation in the multi-antenna transmit processor 457. Each transmitter 454 first converts a baseband symbol stream provided by the multi-antenna transmit processor 457 into a radio frequency symbol stream, and then provides the radio frequency symbol stream to the antennas 452.

In the transmission from the first communications device 450 to the second communications device 410, a function at the second communications device 410 is similar to the receive function at the first communications device 450 described in the transmission from the second communications device 410 to the first communications device 450. Each receiver 418 receives a radio frequency signal through its corresponding antenna 420, converts the received radio frequency signal into a baseband signal, and provides the baseband signal to the multi-antenna receive processor 472 and the receive processor 470. The receive processor 470 and the multi-antenna receive processor 472 jointly implement functions of the L1 layer. The controller/processor 475 implements functions of the L2 layer. The controller/processor 475 may be associated with the memory 476 that stores program codes and data. The memory 476 may be referred to as a computer-readable medium. In the transmission from the first communications device 450 to the second communications device 410, the controller/processor 475 provides demultiplexing between a transport channel and a logical channel, packet reassembly, decryption, header decompression, and control signal processing, to recover an upper layer data packet from the first communications device 450. The upper layer data packet from the controller/processor 475 may be provided to a core network or all protocol layers above the L2 layer, or various control signals may be provided to the core network or the L3 layer for processing by the L3 layer.

In an embodiment, the first communications device 450 includes: at least one processor and at least one memory. The at least one memory includes computer program code. The at least one memory and the computer program code are configured to be used together with the at least one processor. The first communications device 450 is configured to at least: receive a first synchronization signal block, where an index of the first synchronization signal block is one of a plurality of candidate synchronization signal block indexes; and transmit a first preamble group, where the first preamble group includes a plurality of preambles. A first random access channel occasion group includes a plurality of random access channel occasions, and the plurality of random access channel occasions in the first random access channel occasion group are used for transmitting the plurality of preambles in the first preamble group. Any two random access channel occasions in the first random access channel occasion group are orthogonal in time domain. The plurality of candidate synchronization signal block indexes are mapped to a plurality of random access channel occasion groups according to a first mapping order, and the first random access channel occasion group is one of the plurality of random access channel occasion groups. The first random access channel occasion group corresponds to a first occasion group type, and the first occasion group type is one of a plurality of candidate occasion group types. The index of the first synchronization signal block, the first occasion group type, and the first mapping order are used to determine the first random access channel occasion group.

In an embodiment, the first communications device 450 includes: a memory for storing a computer-readable instruction program, where the computer-readable instruction program generates actions when being executed by at least one processor, and the actions include: receiving a first synchronization signal block, where an index of the first synchronization signal block is one of a plurality of candidate synchronization signal block indexes; and transmitting a first preamble group, where the first preamble group includes a plurality of preambles. A first random access channel occasion group includes a plurality of random access channel occasions, and the plurality of random access channel occasions in the first random access channel occasion group are used for transmitting the plurality of preambles in the first preamble group. Any two random access channel occasions in the first random access channel occasion group are orthogonal in time domain. The plurality of candidate synchronization signal block indexes are mapped to a plurality of random access channel occasion groups according to a first mapping order, and the first random access channel occasion group is one of the plurality of random access channel occasion groups. The first random access channel occasion group corresponds to a first occasion group type, and the first occasion group type is one of a plurality of candidate occasion group types. The index of the first synchronization signal block, the first occasion group type, and the first mapping order are used to determine the first random access channel occasion group.

In an embodiment, the first communications device 450 corresponds to the first node in the present application.

In an embodiment, the second communications device 410 corresponds to the second node in the present application.

In an embodiment, the first communications device 450 is a UE.

In an embodiment, the first communications device 450 is a UE that supports V2X.

In an embodiment, the first communications device 450 is a UE that supports D2D.

In an embodiment, the first communications device 450 is a network-controlled repeater.

In an embodiment, the first communications device 450 is a relay.

In an embodiment, the second communications device 410 is a base station.

In an embodiment, the antenna 452, the receiver 454, the multi-antenna receive processor 458, the receive processor 456, and the controller/processor 459 are configured to receive the first synchronization signal block in the present application.

In an embodiment, the antenna 420, the transmitter 418, the multi-antenna transmit processor 471, the transmit processor 416, and the controller/processor 475 are configured to transmit one or more synchronization signal blocks in the present application, and the first synchronization signal block is one of the one or more synchronization signal blocks.

In an embodiment, the antenna 452, the transmitter 454, the multi-antenna transmit processor 457, the transmit processor 468, and the controller/processor 459 are configured to transmit the first preamble group in the present application.

In an embodiment, the antenna 420, the receiver 418, the multi-antenna receive processor 472, the receive processor 470, and the controller/processor 475 are configured to receive the first preamble group in the present application.

An embodiment of the present application further provides a computer-readable storage medium for storing a program. The computer-readable storage medium may be applied to the terminal or the network device provided in the embodiments of the present application, and the program causes a computer to perform the methods to be performed by the terminal or the network device in various embodiments of the present application.

An embodiment of the present application further provides a computer program product. The computer program product includes a program. The computer program product may be applied to the terminal or the network device provided in the embodiments of the present application, and the program causes a computer to perform the methods to be performed by the terminal or the network device in various embodiments of the present application.

An embodiment of the present application further provides a computer program. The computer program may be applied to the terminal or the network device provided in the embodiments of the present application, and the computer program causes a computer to perform the methods to be performed by the terminal or the network device in various embodiments of the present application.

It should be understood that, the terms "system" and "network" in the present application may be used interchangeably. In addition, the terms used in the present application are only used to explain the specific embodiments of the present application, and are not intended to limit the present application. It should be noted that, the terms "first", "second", "third", "fourth", and the like in the specification, claims, and drawings of the present application are used to distinguish between different objects, rather than to describe a specific order. In addition, the terms "include" and "have" and any variations thereof are intended to cover a non-exclusive inclusion.

In the embodiments of the present application, "indicate" mentioned herein may refer to a direct indication, or may refer to an indirect indication, or may mean that there is an association relationship. For example, A indicates B, which may mean that A directly indicates B, as an example, B may be obtained by means of A; or may mean that A indirectly indicates B, as an example, A indicates C, and B may be obtained by means of C; or may mean that there is an association relationship between A and B.

In the embodiments of the present application, "B that is corresponding to A" means that B is associated with A, and B may be determined based on A. However, it should also be understood that, determining B based on A does not mean determining B based only on A, but instead B may be determined based on A and/or other information.

In the embodiments of the present application, the term "corresponding" may mean that there is a direct or indirect correspondence between the two, or may mean that there is an association relationship between the two, or may mean that there is a relationship such as indicating and being indicated, or configuring and being configured.

In the embodiments of the present application, "pre-defined" or "pre-configured" may be implemented by pre-storing corresponding codes, tables, or other forms that may be used to indicate related information in devices (for example, including a UE and a network device), and a specific implementation thereof is not limited in the present application. For example, pre-defined may refer to defined in a protocol.

In the embodiments of the present application, the "protocol" may refer to a standard protocol in the communications field, and may include, for example, an LTE protocol, an NR protocol, and a related protocol applied to a future communications system, which is not limited in the present application.

In the embodiments of the present application, the term "and/or" is merely an association relationship that describes associated objects, and represents that there may be three relationships. For example, A and/or B may represent three cases: only A exists, both A and B exist, and only B exists.

In addition, the character "/" herein generally indicates an "or" relationship between the associated objects.

In the embodiments of the present application, sequence numbers of the foregoing processes do not mean execution sequences. The execution sequences of the processes should be determined according to functions and internal logic of the processes, and should not be construed as any limitation on the implementation processes of the embodiments of the present application.

In several embodiments provided in the present application, it should be understood that, the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may be or may not be physically separated, and the components displayed as units may be or may not be physical units, that is, may be located in one place or distributed on a plurality of network units. Some or all of the units may be selected according to an actual need to achieve the objectives of the solutions of the embodiments.

In addition, function units in the embodiments of the present application may be integrated into one processing unit, or each of the units may exist alone physically, or two or more units may be integrated into one unit.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on a computer, the procedures or functions according to the embodiments of the present application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (such as a coaxial cable, an optical fiber, and a digital subscriber line (DSL)) manner or a wireless (such as infrared, wireless, and microwave) manner. The computer-readable storage medium may be any usable medium readable by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

The foregoing descriptions are merely specific implementations of the present application, but the protection scope of the present application is not limited thereto. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A first node, comprising:
at least one processor;
one or more non-transitory computer-readable storage media coupled to the at least one processor and storing programming instructions for execution by the at least one processor, wherein the programming instructions, when executed, cause the first node to perform operations comprising:
receiving a first synchronization signal/physical broadcast channel block (SS/PBCH) block, wherein an index of the first SS/PBCH block is one of a plurality of candidate SS/PBCH block indexes;
transmitting a first preamble group, wherein the first preamble group comprises a plurality of preambles; a first physical random access channel (PRACH) occasion group comprises a plurality of PRACH occasions, and the plurality of PRACH occasions in the first PRACH occasion group are configured for transmitting the plurality of preambles in the first preamble group; and any two PRACH occasions in the first PRACH occasion group are orthogonal in time domain, wherein the plurality of preambles are associated with a random access response, wherein the plurality of candidate SS/PBCH block indexes are mapped to a plurality of PRACH occasion groups in a first mapping order, and the first PRACH occasion group is one of the plurality of PRACH occasion groups; the first PRACH occasion group corresponds to a first occasion group parameter, and the first occasion group parameter is one of a plurality of candidate occasion group parameters; wherein the first occasion group parameter indicates at least one of a quantity of PRACH occasions comprised in the first PRACH occasion group or a resource pattern in the first PRACH occasion group, and the index of the first SS/PBCH block, the first occasion group parameter, and the first mapping order are used to determine the first PRACH occasion group; and
receiving the random access response associated with the plurality of preambles.

2. The first node according to claim 1, wherein each of the plurality of PRACH occasion groups comprises a plurality of PRACH occasions; each of the plurality of PRACH occasion comprised in the first PRACH occasion group is valid; preamble indexes of preambles corresponding to each PRACH occasion in the first PRACH occasion group are the same; and the plurality of preambles in the first preamble group are transmitted using a same spatial filter.

3. The first node according to claim 1, wherein the mapping of the plurality of candidate SS/PBCH block indexes to the plurality of PRACH occasion groups is performed in a first period; the first period starts from frame number 0; the first period is an association pattern period including one or more association periods.

4. The first node according to claim 1, wherein the first occasion group parameter comprises a first repetition factor that is equal to the quantity of PRACH occasions comprised in the first PRACH occasion group, the first repetition factor is one of a plurality of repetition factors, and the plurality of repetition factors comprise two, four and eight.

5. The first node according to claim 4, wherein each PRACH occasion group in the plurality of PRACH occasion groups corresponds to one of the plurality of candidate occasion group parameters; the plurality of candidate occasion group parameters respectively comprise the plurality of repetition factors, and a quantity of PRACH occasions comprised in a second PRACH occasion group is equal to a second repetition factor, the second repetition factor is one of the plurality of repetition factors corresponding to the second PRACH occasion group, wherein the second PRACH occasion group is a PRACH occasion group in the plurality of PRACH occasion groups.

6. The first node according to claim 1, wherein the first occasion group parameter comprises a first frequency hopping indication; and the first frequency hopping indication is used to determine whether frequency resources occupied by at least two PRACH occasions in the first PRACH occasion group are different; or
wherein the first occasion group parameter comprises a first frequency hopping pattern; and a frequency resource occupied by each PRACH occasion in the first PRACH occasion group corresponds to the first frequency hopping pattern.

7. The first node according to claim 1, wherein the index of the first SS/PBCH block, the first occasion group parameter, and the first mapping order being used to determine the first PRACH occasion group comprises that:
the index of the first SS/PBCH block is mapped to at least two PRACH occasion groups of the plurality of PRACH occasion groups in the first mapping order, the at least two PRACH occasion groups respectively correspond to at least two of plurality of candidate occasion group parameters, and the first occasion group parameter is used to determine the first PRACH occasion group from the at least two PRACH occasion groups.

8. The first node according to claim 1, wherein the index of the first SS/PBCH block, the first occasion group parameter, and the first mapping order being used to determine the first PRACH occasion group comprises that:
the first occasion group parameter is a first repetition factor, the first repetition factor is one of a plurality of repetition factors; the index of the first SS/PBCH block is mapped to at least two PRACH occasion groups of the plurality of PRACH occasion groups in the first mapping order, the at least two PRACH occasion groups respectively correspond to at least two of the plurality of repetition factors, and the first repetition factor is used to determine the first PRACH occasion group from the at least two PRACH occasion groups.

9. The first node according to claim 1, wherein the index of the first SS/PBCH block, the first occasion group parameter, and the first mapping order being used to determine the first PRACH occasion group comprises that:
the first occasion group parameter is used to determine at least L PRACH occasion groups from the plurality of PRACH occasion groups, and the index of the first SS/PBCH block and the first mapping order are used to determine the first PRACH occasion group from the at least L PRACH occasion groups, wherein L is a positive integer greater than 1.

10. The first node according to claim 1, wherein the index of the first SS/PBCH block, the first occasion group parameter, and the first mapping order being used to determine the first PRACH occasion group comprises that:
the first occasion group parameter is a first repetition factor; the first repetition factor is used to determine at least L PRACH occasion groups from the plurality of PRACH occasion groups, and the index of the first SS/PBCH block and the first mapping order are used to determine the first PRACH occasion group from the at least L PRACH occasion groups, wherein L is a positive integer greater than 1.

11. The first node according to claim 1, wherein the first mapping order comprises one or more of the following orders:
an increasing order of preamble indexes within one PRACH occasion group in the plurality of PRACH occasion groups;
an increasing order of frequency resource indexes for the plurality of PRACH occasion groups; or
an increasing order of time resource indexes for the plurality of PRACH occasion groups.

12. The first node according to claim 11, wherein the first mapping order comprises: first, in an increasing order of preamble indexes within one PRACH occasion group in the plurality of PRACH occasion groups; second, in an increasing order of frequency resource indexes for the plurality of PRACH occasion groups; and third, in an increasing order of time resource indexes for the plurality of PRACH occasion groups.

13. The first node according to claim 1, wherein the plurality of PRACH occasion groups comprise a plurality of PRACH occasions; each of the plurality of PRACH occasions comprised in the plurality of PRACH occasion groups belongs to only one of the plurality of PRACH occasion groups; or each of the plurality of PRACH occasions is shared by at least two of the plurality of PRACH occasion groups.

14. The first node according to claim 1, wherein at least two PRACH occasions in at least one of the plurality of PRACH occasion groups are in two different slots.

15. The first node according to claim 1, wherein the operations comprise receiving a first random access response in a first time window in response to transmitting the first preamble group, wherein
the first PRACH occasion group is used to determine a start of the first time window; and the first PRACH occasion group is used to determine a scrambling sequence for the first random access response.

16. A second node, comprising:
at least one processor;
one or more non-transitory computer-readable storage media coupled to the at least one processor and storing programming instructions for execution by the at least one processor, wherein the programming instructions, when executed, cause the second node to perform operations comprising:
transmitting one or more SS/PBCH blocks including a first SS/PBCH block, and an index of the first SS/PBCH block is one of a plurality of candidate SS/PBCH block indexes;
receiving a first preamble group from a first node, wherein the first preamble group comprises a plurality of preambles; a first PRACH occasion group comprises a plurality of PRACH occasions, and the plurality of PRACH occasions in the first PRACH occasion group are configured for transmitting the plurality of preambles in the first preamble group; and any two PRACH occasions in the first PRACH occasion group are orthogonal in time domain, wherein the plurality of preambles are associated with a random access response, wherein the plurality of candidate SS/PBCH block indexes are mapped to a plurality of PRACH occasion groups in a first mapping order, and the first PRACH occasion group is one of the plurality of PRACH occasion groups; the first PRACH occasion group corresponds to a first occasion group parameter, and the first occasion group parameter is one of a plurality of candidate occasion group parameters; wherein the first occasion group parameter indicates at least one of a quantity of PRACH occasions comprised in the first PRACH occasion group or a resource pattern in the first PRACH occasion group, and the index of the first SS/PBCH block, the first occasion group parameter, and the first mapping order are used to determine the first PRACH occasion group; and
transmitting the random access response associated with the plurality of preambles.

17. The second node according to claim 16, wherein each of the plurality of PRACH occasion groups comprises a plurality of PRACH occasions; each of the plurality of PRACH occasions comprised in the first PRACH occasion group is valid; preamble indexes of preambles corresponding to each PRACH occasion in the first PRACH occasion group are the same; and the plurality of preambles in the first preamble group are transmitted using a same spatial filter.

18. The second node according to claim 16, wherein the mapping of the plurality of candidate SS/PBCH block indexes to the plurality of PRACH occasion groups is performed in a first period; the first period starts from frame number 0; the first period is an association pattern period including one or more association periods.

19. The second node according to claim 16, wherein the first occasion group parameter comprises a first repetition factor, a quantity of PRACH occasions comprised in the first PRACH occasion group is equal to the first repetition factor, the first repetition factor is one of a plurality of repetition factors, and the plurality of repetition factors comprise two, four and eight; or
wherein the first occasion group parameter comprises a first repetition factor, a quantity of PRACH occasions comprised in the first PRACH occasion group is equal to the first repetition factor, and the first repetition factor is one of a plurality of repetition factors, and the plurality of repetition factors comprise two, four and eight; and each PRACH occasion group in the plurality of PRACH occasion groups corresponds to one of the plurality of candidate occasion group parameters; the plurality of candidate occasion group parameters respectively comprise the plurality of repetition factors, and a quantity of PRACH occasions comprised in a second PRACH occasion group is equal to a second repetition factor, the second repetition factor is one of the plurality of repetition factors corresponding to the second PRACH occasion group, wherein the second PRACH occasion group is a PRACH occasion group in the plurality of PRACH occasion groups.

20. A method, comprising:
receiving a first SS/PBCH block, wherein an index of the first SS/PBCH block is one of a plurality of candidate SS/PBCH block indexes;
transmitting, by a first node, a first preamble group, wherein the first preamble group comprises a plurality of preambles; a first PRACH occasion group comprises a plurality of PRACH occasions, and the plurality of PRACH occasions in the first PRACH occasion group are configured for transmitting the plurality of preambles in the first preamble group; and any two PRACH occasions in the first PRACH occasion group are orthogonal in time domain, wherein the plurality of preambles are associated with a random access response, wherein
the plurality of candidate SS/PBCH block indexes are mapped to a plurality of PRACH occasion groups in a first mapping order, and the first PRACH occasion group is one of the plurality of PRACH occasion groups; the first PRACH occasion group corresponds to a first occasion group parameter, and the first occasion group parameter is one of a plurality of candidate occasion group parameters; wherein the first occasion group parameter indicates at least one of a quantity of PRACH occasions comprised in the first PRACH occasion group or a resource pattern in the first PRACH occasion group, and the index of the first SS/PBCH block, the first occasion group parameter, and the first mapping order are used to determine the first PRACH occasion group; and
receiving the random access response associated with the plurality of preambles.

* * * * *